(12) United States Patent
Dromaretsky et al.

(10) Patent No.: US 8,335,413 B2
(45) Date of Patent: Dec. 18, 2012

(54) OPTICAL SWITCH

(75) Inventors: Alexander Dromaretsky, San Diego, CA (US); Michael Pushkarsky, San Diego, CA (US); Brandon Borgardt, Escondido, CA (US)

(73) Assignee: Daylight Solutions, Inc., San Diego, CA (US)

( * ) Notice: Subject to any disclaimer, the term of this patent is extended or adjusted under 35 U.S.C. 154(b) by 0 days.

(21) Appl. No.: 13/267,787

(22) Filed: Oct. 6, 2011

(65) Prior Publication Data

US 2012/0057366 A1 Mar. 8, 2012

Related U.S. Application Data

(63) Continuation-in-part of application No. 12/780,575, filed on May 14, 2010.

(60) Provisional application No. 61/390,260, filed on Oct. 6, 2010.

(51) Int. Cl.
*G02B 6/34* (2006.01)
*G02B 6/26* (2006.01)
*G02B 6/42* (2006.01)

(52) U.S. Cl. ............... 385/36; 385/16; 385/17; 385/18

(58) Field of Classification Search .............. None
See application file for complete search history.

(56) References Cited

U.S. PATENT DOCUMENTS

| | | |
|---|---|---|
| 2,684,015 A | 7/1954 | Grey |
| 3,782,832 A | 1/1974 | Hacskaylo |
| 4,266,873 A | 5/1981 | Hacskaylo |
| 4,470,662 A | 9/1984 | Mumzhiu |
| 4,555,627 A | 11/1985 | McRae, Jr. |
| 4,656,641 A | 4/1987 | Scifres et al. |
| 4,737,028 A | 4/1988 | Smith |
| 4,745,276 A | 5/1988 | Broicher et al. |
| 4,772,789 A | 9/1988 | Maram et al. |
| 4,796,266 A | 1/1989 | Banwell et al. |
| 4,852,956 A | 8/1989 | Kramer |
| 4,871,916 A | 10/1989 | Scott |

(Continued)

FOREIGN PATENT DOCUMENTS

DE 10205310 A1 9/2003

(Continued)

OTHER PUBLICATIONS

Hildebrandt, L.et al.."Quantum cascade external cavity laser systems in the mid-infrared spectral range," 2004, Sacher Lasertechnik Group, Marburg, Germany.

(Continued)

*Primary Examiner* — Rhonda Peace
(74) *Attorney, Agent, or Firm* — Roeder & Broder LLP

(57) ABSTRACT

An optical fiber switch (16) for alternatively redirecting an input beam (14) comprises a redirector (18) and a redirector mover (20). The redirector (18) redirects the input beam (14) so that a redirected beam (46) alternatively launches from the redirector (18) (i) along a first redirected axis (354) that is spaced apart from a directed axis (344A) when the redirector (18) is positioned at a first position (348), and (ii) along a second redirected axis (356) that is spaced apart from the directed axis (344A) when the redirector (18) is positioned at a second position (350) that is different from the first position (348). The redirector mover (20) moves the redirector (18) about a movement axis (366) between the first position (348) and the second position (350).

24 Claims, 6 Drawing Sheets

U.S. PATENT DOCUMENTS

| | | | |
|---|---|---|---|
| 5,005,934 A | 4/1991 | Curtiss | |
| 5,050,176 A | 9/1991 | Naito et al. | |
| 5,056,097 A | 10/1991 | Meyers | |
| 5,064,988 A | 11/1991 | E'nama et al. | |
| 5,068,867 A | 11/1991 | Hasenberg et al. | |
| 5,082,339 A | 1/1992 | Linnebach | |
| 5,082,799 A | 1/1992 | Holmstrom et al. | |
| 5,118,186 A | 6/1992 | Schraetzenstaller et al. | |
| 5,140,599 A | 8/1992 | Trutna, Jr. et al. | |
| 5,161,408 A | 11/1992 | McRae et al. | |
| 5,172,390 A | 12/1992 | Mooradian | |
| 5,181,214 A | 1/1993 | Berger et al. | |
| 5,208,417 A | 5/1993 | Langer et al. | |
| 5,225,679 A | 7/1993 | Clarke et al. | |
| 5,255,073 A | 10/1993 | Wallin et al. | |
| 5,264,368 A | 11/1993 | Clarke et al. | |
| 5,315,436 A | 5/1994 | Lowehnar et al. | |
| 5,331,651 A | 7/1994 | Becker et al. | |
| 5,355,609 A | 10/1994 | Schenke | |
| 5,430,293 A | 7/1995 | Sato et al. | |
| 5,457,709 A | 10/1995 | Capasso et al. | |
| 5,476,385 A | 12/1995 | Parikh et al. | |
| 5,491,714 A | 2/1996 | Kitamura | |
| 5,523,569 A | 6/1996 | Hornfeld et al. | |
| 5,537,432 A | 7/1996 | Mehuys et al. | |
| 5,656,813 A | 8/1997 | Moore et al. | |
| 5,662,819 A | 9/1997 | Kadomura | |
| 5,671,561 A | 9/1997 | Johnson et al. | |
| 5,685,636 A | 11/1997 | German | |
| 5,751,830 A | 5/1998 | Hutchinson | |
| 5,752,100 A | 5/1998 | Schrock | |
| 5,780,724 A | 7/1998 | Olender et al. | |
| 5,824,884 A | 10/1998 | Olender et al. | |
| 5,834,632 A | 11/1998 | Olender et al. | |
| 5,854,422 A | 12/1998 | McKeon et al. | |
| 5,862,162 A | 1/1999 | Maeda | |
| 5,866,073 A | 2/1999 | Sausa et al. | |
| 5,892,617 A | 4/1999 | Wallace | |
| 6,089,076 A | 7/2000 | Mueller et al. | |
| 6,134,257 A | 10/2000 | Capasso et al. | |
| 6,154,307 A | 11/2000 | Veronesi et al. | |
| 6,157,033 A | 12/2000 | Chudnovsky | |
| 6,192,064 B1 | 2/2001 | Algots et al. | |
| 6,243,404 B1 | 6/2001 | Joyce | |
| 6,326,646 B1 | 12/2001 | Baillargeon et al. | |
| 6,327,896 B1 | 12/2001 | Veronesi et al. | |
| 6,335,993 B1* | 1/2002 | Takahashi | 385/25 |
| 6,363,648 B1 | 4/2002 | Kranich et al. | |
| 6,400,744 B1 | 6/2002 | Capasso et al. | |
| 6,431,732 B1 | 8/2002 | Brown et al. | |
| 6,470,036 B1 | 10/2002 | Bailey et al. | |
| 6,483,978 B1 | 11/2002 | Gao et al. | |
| 6,553,045 B2 | 4/2003 | Kaspi | |
| 6,575,641 B2 | 6/2003 | Yamabayashi et al. | |
| 6,578,311 B2 | 6/2003 | Danielson et al. | |
| 6,597,829 B2* | 7/2003 | Cormack | 385/22 |
| 6,608,847 B2 | 8/2003 | Zhang et al. | |
| 6,616,452 B2 | 9/2003 | Clark et al. | |
| 6,636,539 B2 | 10/2003 | Martinsen | |
| 6,678,429 B2 | 1/2004 | Mossberg et al. | |
| 6,690,472 B2 | 2/2004 | Kulp et al. | |
| 6,714,564 B1 | 3/2004 | Meyers | |
| 6,782,162 B2 | 8/2004 | Fukuzawa et al. | |
| 6,803,577 B2 | 10/2004 | Edner et al. | |
| 6,823,115 B2 | 11/2004 | Greiner et al. | |
| 6,829,417 B2 | 12/2004 | Greiner et al. | |
| 6,856,717 B2 | 2/2005 | Kilian | |
| 6,859,318 B1 | 2/2005 | Mossberg | |
| 6,859,481 B2 | 2/2005 | Zheng | |
| 6,866,089 B2 | 3/2005 | Avila | |
| 6,879,441 B1 | 4/2005 | Mossberg | |
| 6,885,965 B2 | 4/2005 | Butler et al. | |
| 6,909,539 B2 | 6/2005 | Korniski et al. | |
| 6,961,491 B2 | 11/2005 | Greiner et al. | |
| 6,965,464 B2 | 11/2005 | Mossberg | |
| 6,965,716 B2 | 11/2005 | Greiner et al. | |
| 6,985,656 B2 | 1/2006 | Iazikov et al. | |
| 6,987,911 B2 | 1/2006 | Mossberg et al. | |
| 6,990,276 B2 | 1/2006 | Brice et al. | |
| 6,993,223 B2 | 1/2006 | Greiner et al. | |
| 6,995,846 B2 | 2/2006 | Kalayeh et al. | |
| 7,009,743 B2 | 3/2006 | Mossberg | |
| 7,032,431 B2 | 4/2006 | Baum et al. | |
| 7,051,469 B1 | 5/2006 | Pochapsky et al. | |
| 7,054,517 B2 | 5/2006 | Mossberg et al. | |
| 7,061,022 B1 | 6/2006 | Pham et al. | |
| 7,062,128 B2 | 6/2006 | Mossberg | |
| 7,063,260 B2 | 6/2006 | Mossberg et al. | |
| 7,088,076 B2 | 8/2006 | Densham et al. | |
| 7,116,453 B2 | 10/2006 | Mossberg | |
| 7,120,334 B1 | 10/2006 | Greiner et al. | |
| 7,123,794 B2 | 10/2006 | Greiner et al. | |
| 7,151,787 B2 | 12/2006 | Kulp et al. | |
| 7,181,103 B1 | 2/2007 | Greiner et al. | |
| 7,189,970 B2 | 3/2007 | Racca et al. | |
| 7,190,856 B1 | 3/2007 | Iazikov et al. | |
| 7,190,858 B1 | 3/2007 | Greiner et al. | |
| 7,190,859 B2 | 3/2007 | Greiner et al. | |
| 7,194,164 B2 | 3/2007 | Iazikov et al. | |
| 7,203,401 B2 | 4/2007 | Mossberg et al. | |
| 7,224,855 B2 | 5/2007 | Iazikov et al. | |
| 7,224,867 B2 | 5/2007 | Mossberg | |
| 7,231,862 B1 | 6/2007 | Quinn | |
| 7,260,290 B1 | 8/2007 | Greiner et al. | |
| 7,265,842 B2 | 9/2007 | Paldus et al. | |
| 7,286,732 B2 | 10/2007 | Greiner et al. | |
| 7,292,755 B1 | 11/2007 | Greiner et al. | |
| 7,325,318 B2 | 2/2008 | Roes | |
| 7,325,354 B2 | 2/2008 | Grauslys et al. | |
| 7,327,908 B1 | 2/2008 | Iazikov et al. | |
| 7,330,614 B1 | 2/2008 | Mossberg et al. | |
| 7,333,692 B1 | 2/2008 | Mossberg et al. | |
| 7,341,189 B2 | 3/2008 | Mossberg et al. | |
| 7,345,277 B2 | 3/2008 | Zhang | |
| 7,349,599 B1 | 3/2008 | Iazikov et al. | |
| 7,358,498 B2 | 4/2008 | Geng et al. | |
| 7,359,597 B1 | 4/2008 | Iazikov et al. | |
| 7,424,042 B2 | 9/2008 | Day et al. | |
| 7,429,734 B1 | 9/2008 | Tidwell | |
| 7,466,734 B1 | 12/2008 | Day et al. | |
| 7,490,430 B2 | 2/2009 | Staley | |
| 7,492,806 B2 | 2/2009 | Day et al. | |
| 7,505,119 B2 | 3/2009 | Rogers | |
| 7,535,656 B2 | 5/2009 | Day et al. | |
| 7,535,936 B2 | 5/2009 | Day et al. | |
| 7,559,169 B2 | 7/2009 | Hung et al. | |
| 7,590,316 B2 | 9/2009 | Dames | |
| 7,623,234 B2 | 11/2009 | Puzey | |
| 7,692,126 B2* | 4/2010 | Aragones et al. | 244/3.1 |
| 7,732,767 B2 | 6/2010 | Houde-Walter | |
| 7,733,925 B2 | 6/2010 | Pushkarsky et al. | |
| 7,753,549 B2 | 7/2010 | Solinsky et al. | |
| 7,755,041 B2 | 7/2010 | Killinger et al. | |
| 7,796,341 B2 | 9/2010 | Day et al. | |
| 7,818,911 B2 | 10/2010 | Houde-Walter | |
| 7,826,503 B2 | 11/2010 | Day et al. | |
| 7,848,382 B2 | 12/2010 | Weida et al. | |
| 7,873,094 B2 | 1/2011 | Day et al. | |
| 7,876,981 B2* | 1/2011 | Dames | 385/1 |
| 7,920,608 B2 | 4/2011 | Marsland, Jr. et al. | |
| 8,027,094 B2 | 9/2011 | Day et al. | |
| 8,050,307 B2 | 11/2011 | Day et al. | |
| 8,068,521 B2 | 11/2011 | Weida et al. | |
| 2002/0024979 A1 | 2/2002 | Vilhelmsson et al. | |
| 2002/0064198 A1 | 5/2002 | Koizumi | |
| 2002/0090013 A1 | 7/2002 | Murry et al. | |
| 2002/0105699 A1 | 8/2002 | Miracky et al. | |
| 2002/0150133 A1 | 10/2002 | Aikiyo et al. | |
| 2002/0176473 A1 | 11/2002 | Mouradian | |
| 2003/0043877 A1 | 3/2003 | Kaspi | |
| 2003/0063633 A1 | 4/2003 | Zhang et al. | |
| 2003/0095346 A1 | 5/2003 | Nasu et al. | |
| 2003/0123495 A1 | 7/2003 | Cox | |
| 2003/0127596 A1 | 7/2003 | Kosterev et al. | |
| 2003/0174315 A1 | 9/2003 | Byren et al. | |
| 2003/0179789 A1 | 9/2003 | Pilgrim et al. | |
| 2003/0198274 A1 | 10/2003 | Lucchetti | |

| | | | |
|---|---|---|---|
| 2004/0013154 | A1 | 1/2004 | Zheng |
| 2004/0032891 | A1 | 2/2004 | Ikeda et al. |
| 2004/0095579 | A1 | 5/2004 | Bisson et al. |
| 2004/0165640 | A1 | 8/2004 | Clifford et al. |
| 2004/0208602 | A1 | 10/2004 | Plante |
| 2004/0228371 | A1 | 11/2004 | Kolodzey et al. |
| 2004/0238811 | A1 | 12/2004 | Nakamura et al. |
| 2004/0264523 | A1 | 12/2004 | Posamentier |
| 2005/0083568 | A1 | 4/2005 | Nakae et al. |
| 2005/0105566 | A1 | 5/2005 | Sacher |
| 2005/0199869 | A1 | 9/2005 | Shi |
| 2005/0213627 | A1 | 9/2005 | Masselink et al. |
| 2005/0237524 | A1 | 10/2005 | Kamei |
| 2006/0056466 | A1 | 3/2006 | Belenky et al. |
| 2006/0214107 | A1 | 9/2006 | Mueller |
| 2006/0262316 | A1 | 11/2006 | Baney |
| 2006/0268947 | A1 | 11/2006 | Kalayeh |
| 2007/0019702 | A1 | 1/2007 | Day et al. |
| 2007/0030865 | A1 | 2/2007 | Day et al. |
| 2007/0047599 | A1 | 3/2007 | Wysocki et al. |
| 2007/0209268 | A1 | 9/2007 | Birurakis et al. |
| 2007/0291804 | A1 | 12/2007 | Day et al. |
| 2008/0075133 | A1 | 3/2008 | Day et al. |
| 2008/0231719 | A1 | 9/2008 | Benson |
| 2008/0298406 | A1 | 12/2008 | Day et al. |
| 2008/0304524 | A1 | 12/2008 | Marsland et al. |
| 2009/0015914 | A1 | 1/2009 | Duncan et al. |
| 2009/0121072 | A1* | 5/2009 | Aragones et al. ............ 244/3.16 |
| 2009/0159798 | A1 | 6/2009 | Weida et al. |
| 2009/0213882 | A1 | 8/2009 | Weida et al. |
| 2009/0257709 | A1 | 10/2009 | Dames |
| 2009/0262768 | A1 | 10/2009 | Day et al. |
| 2010/0110198 | A1 | 5/2010 | Larson et al. |
| 2010/0111122 | A1* | 5/2010 | Pushkarsky et al. ............ 372/32 |
| 2010/0132581 | A1 | 6/2010 | Day et al. |
| 2010/0229448 | A1 | 9/2010 | Houde-Walter et al. |
| 2010/0243891 | A1 | 9/2010 | Day et al. |
| 2010/0302796 | A1* | 12/2010 | Pushkarsky et al. .......... 362/553 |
| 2011/0006229 | A1 | 1/2011 | Day et al. |
| 2011/0080311 | A1* | 4/2011 | Pushkarsky et al. ............ 342/14 |
| 2011/0222566 | A1 | 9/2011 | Weida et al. |
| 2011/0233409 | A1 | 9/2011 | Weida et al. |
| 2012/0057254 | A1* | 3/2012 | Arnone et al. ................ 359/872 |
| 2012/0057366 | A1* | 3/2012 | Dromaretsky et al. ....... 362/553 |
| 2012/0068001 | A1* | 3/2012 | Pushkarsky et al. ......... 244/3.16 |

FOREIGN PATENT DOCUMENTS

| | | |
|---|---|---|
| EP | 0 877 454 A1 | 11/1998 |
| EP | 0 883 220 A2 | 12/1998 |
| EP | 2 081 265 A3 | 9/2009 |
| EP | 2 113 975 A2 | 11/2009 |
| EP | 2256528 A1 | 12/2010 |
| GB | 2286901 A | 8/1995 |
| JP | 55087107 A | 7/1980 |
| JP | 58072108 | 4/1983 |
| JP | 03-048480 A | 3/1991 |
| JP | 07-024322 B | 1/1995 |
| JP | 2005317819 A | 11/2005 |
| WO | WO9220127 A1 | 11/1992 |
| WO | WO 03/067720 A2 | 8/2003 |
| WO | WO2006045303 A2 | 5/2006 |
| WO | WO2008036881 A2 | 3/2008 |
| WO | WO2008036884 A2 | 3/2008 |

OTHER PUBLICATIONS

Haim Lotem, Mode-hop suppression of Littrow grating-tuned lasers: comment, 20 Month 1994, p. 1, vol. 33, No. 00, Applied Optics.

Patrick McNicholl and Harold J. Metcalf, Synchronous cavity mode and feedback wavelength scanning in dye laser oscillators with gratings, Sep. 1, 1985, pp. 2757-2761, vol. 24, No. 17, Applied Optics, © 1985 Optical Society of America.

Corrie David Farmer, "Fab and Eval. of QCL's", Sep. 2000, Faculty of Engineering, University of Glasgow, Glasgow, UK.

M. De Labachelerie and G. Passedat, Mode-hop suppression of Littrow grating-tuned lasers, Jan. 20, 1993, pp. 269-274, vol. 32, No. 3, Applied Optics, © 1993 Optical Society of America.

S. Blaser et al., Alpes Lasers, Room-temperature continuous-wave single-mode quantum cascade lasers, Photonics West 2006, Novel In-Plane Semiconductors V:Quantum Cascade Lasers:6133-01 Switzerland.

Gaetano Scamarcio, Mid-IR and THz Quantum Cascade Lasers, 2005, Physics Dept., University of Bari, Bari Italy.

Gaetano Scamarcio et al., Micro-probe characterization of QCLs correlation with optical performance, APL 78, 1177 & APL 78, 2095 (2001), APL 2002, APL 2004, University of Bari, Bari Italy.

J. Faist, THz and Mid-IR Quantum cascade lasers, QM in space, Chatillon, Mar. 31, Science 2002, University of Neuchatel, EU Projects Answer/Teranova; Agilent, Funding Swiss National Science Foundation.

Joel M. Hensley, Recent Updates in QCL-based Sensing Applications, Sep. 5-10, 2006, Physical Sciences, Inc., Andover, MA, 2nd International Workshop on Quantum Cascade Lasers, Ostuni, Italy.

J.M. Hensley et al., Demonstration of an External Cavity Terahertz Quantum Cascade Laser, Copyright 2005, Optical Society of America, Washington, DC 20036.

L. Hildebrandt et al., Quantum cascade external cavity and DFB laser systems in the mid-infrared spectral range: devices and applications, 2004, Marburg Germany.

Richard Maulini et al., Broadly tunable external cavity quantum-cascade lasers, 2005, University of Neuchatel, Neuchatel Switzerland.

Tsekoun, A. et al; "Improved performance of QCL's through a scalable, manufacturable epitaxial-side-down mounting process"; Feb. 2006.

Pushkarsky, M. et al.; "Sub-parts-per-billion level detection of NO2 using room temp. QCLs"; May 2006.

Wirtz, D. et al.; "A tuneable heterodyne infrared spectrometer"; Physikalisches Institut; University of Koln; Koln Germany Spectrochimica 2002.

Williams, B. et al.;"Terahertz QCLs and Electronics"; PhD-MIT 2003.

PCT/US2011/028780 filed Mar. 17, 2011, Daylight Solutions, Inc.

PCT/US2011/43065 filed Jul. 6, 2011, Daylight Solutions, Inc.

U.S. Appl. No. 13/177,332, filed Jul. 6, 2011, Daylight Solutions, Inc.

U.S. Appl. No. 13/211,186, filed Aug. 16, 2011, Daylight Solutions, Inc.

U.S. Appl. No. 13/221,721, filed Aug. 30, 2011, Daylight Solutions, Inc.

U.S. Appl. No. 13/237,461, filed Sep. 20, 2011, Daylight Solutions, Inc.

U.S. Appl. No. 13/303,088, filed Nov. 22, 2011, Daylight Solutions, Inc.

Weida et al., Utilizing broad gain bandwidth in quantum cascade devices, Nov. 2010, vol. 49 (11) Optical Engineering, 111120, 0091-3286/2010 © 2010 SPIE.

File:LED, 5mm, green (en).svg-Wikipedia, the free encyclopedia, Description English: A labeled drawing of a 5mm round (the "normal" type) LED. Apr. 6, 2009, 3 pages, http://en.wikipedia.org/wiki/File:LED._5mm,_green(en).svg.

Martini, Ranier et al.,"High duty cycle operation of quantum cascade lasers based on graded superlattice active regions," Journal of Applied Physics, Jun. 15, 2001, pp. 7735-7738,vol. 89, No. 12, XP012052642 ISSN:0021-8979, © 2001 American Institute of Physics.

Sirtori, Carlo et al.,"Mid-Infrared (8.5 μm) Semiconductor Lasers Operating at Room Temperature," IEEE Photonics Technology Letters, Mar. 1997, pp. 297-299, vol. 9, No. 3, XP000684396, ISN:1041-1135, © 1997 IEE.

W.Y. Oh et al, "115 kHz tuning repetition rate ultrahigh-speed wavelength-swept semiconductor laser", accepted Aug. 9, 2005, pp. 3159-3163, vol. 30, No. 23, Optics Letters, © 2005 Optical Society of America.

Weida et al., "Tunable QC laser opens up mid-IR sensing applications," Jul. 2006, pp. 1-5, Laser Focus World, http://www.optoiq.com/index/photonics-technologies-applications/lfw-articles-tools-template/_pr....

G.P. Luo et al.,Grating-tuned external-cavity quantum-cascade semiconductor lasers, May 7, 2001, Applied Physics Letters, vol. 78, No. 19, © 2001 American Institute of Physics.

G. Wysocki et al., Widely tunable mode-hop free external cavity quantum cascade laser for high resolution spectroscopic applications, Jul. 27, 2005, Applied Physics, B81, pp. 769-777, Applied Physics B Lasers and Optics.

Day et al., Miniaturized External Cavity Quantum Cascade Lasers for Broad Tunability in the Mid-Infrared, May 21, 2006, 1-55752-813-6, Lasers and Electro-Optics and 2006 Quantum Electronics and Laser Science Conference, © 2006 IEEE.

G. Totschig et al., Mid-infrared external-cavity quantum-cascade laser XP-001161786, Oct. 15, 2002, pp. 1788-1790, Optics Letters/vol. 27, No. 20, © 2002 Optical Society of America.

Thierry Aellen et al., Continuous-wave distributed-feedback quantum-cascade lasers on a Peltier cooler, Sep. 8, 2003, pp. 1929-1931, Applied Physics Letters, vol. 83, No. 10, © 2003 American Institute of Physics.

D. Weidmann et al., Development of a compact quantum cascade laser spectrometer for field measurements of CO2 isotopes, Feb. 1, 2005, pp. 255-260, Applied PhysicsB, Lasers and Optics, Appl. Phys. B 80, published online: Sep. 29, 2004 © Springer-Verlag 2004.

Cassidy et al., Short-external-cavity module for enhanced single-mode tuning of InGaAsP and AlGaAs semiconductor diode lasers, Oct. 1991, No. 10, pp. 2385-2388, © 1991 American Institute of Physics.

M.G. Littman, H.J. Metcalf: "Spectrally narrow pulse dye laser without beam expander" Applied Optics, vol. 17, No. 14, Jul. 15, 1978, pp. 2224-2227, XP002528173 US.

Victor Rudometov and Eugene Rudometrov, Peltier Coolers, May 11, 2005, pp. 1-11, http://www.digit-life.com /article/peltiercoolers.com/ © Digit-Life.com 1997-2004.

T Topfer, KP Petrov, Y Mine, D Jundt, RF Curl, and FK Tittel, Room-temperature mid-infrared laser sensor for trace gas detection, Applied Optics, Oct. 20, 1997, pp. 8042-8049, vol. 36 No. 30, Oct. 20, 1997/ Applied Optics.

Cavity Enhancing Sensors using QC Lasers, Jun. 7, 2005, pp. 1-6, http://www.infrared.phl.gov/enhanced.sensors.html, Webmaster: Pamela Kinsey, Reviewed: Nov. 23, 2004.

Transient FM Absorption Spectroscopy, Jun. 7, 2005, pp. 1 and 2, http://www.chem/tamu.edu/group/north/FM.html.

FM Spectoscopy With Tunable Diode Lasers, Application Note 7, pp. 1-10, New Focus Copyright 2001.

John Andrews and Paul Dalin,Frequency Modulation Spectroscopy, Dec. 2005, pp. 24-26, http://www.spectroscopyeurope.com.

R.F. Curl and F.K. Tittel,Tunable infrared laser spectroscopy, 1998, pp. 219-272, Annu. Rep. Prog-Chem. Sect. C, 2002.

Shawn Wehe et al., AIAA 2002-0824 Measurements of Trace Pollutants in Combustion Flows Using Room-Temperature, Mid-IR Quantum Cascade Lasers, S. Wehe, et al. (Physical Sciences, Inc.) C Gmachi and F Capasso (Bell Lab., Lucent Technologies), Jan. 2002, cover and pp. 1-7, 40th AIAA Aerospace Sciences Meeting and Exhibit 14, Jan. 17, 2002, Reno, NV.

W. Huang, RRA Syms, J. Stagg and A.A. Lohmannm, Precision MEMS Flexure mount for a Littman tunable external cavity laser, Mar. 2004, pp. 67-75, IEE Prc-Sci Meas. Technol vol. 151, No. 2 Mar. 2004.

K. Namjou, S. Cai, E.A. Whitaker, J. Faist, C. Gmacahi, F. Capasso, D.L. Sivco and A.Y. Cho,Sensitive absorption spectroscopy with a room-temperature distributed-feedback quantum-cascade laser, 1998, pp. 219-221, 1998 Optical Society of America.

Gregory E. Hall and Simon W. North,Transient Laser Frequency Modulation Spectroscopy, 2000, pp. 243-274, Annu. Rev.Phys. Chem. 2000.51:243-74—Copyright 2000.

External-cavity quantum-cascade lasers, May 11, 2005, pp. 1-4, http://www.unine.ch/phys/meso/EC/EC.html.

Frequency stabilization of diode lasers, May 30, 2005, pp. 1-17, Santa Chawla—National Physical Laboratory, http://www.ias.ac.in/currsci/jan25/articles41.htm, National Physical Lab, New Delhi 110 012 India.

R.A. Syms, A. Lohmann, MOEMS Tuning Element for a Littrow External Cavity Laser, Dec. 2003, pp. 921-928, Journal of Microelectromechanical Systems, vol. 12, No. 6 Dec. 2003.

A.A. Koserev et al., Thermoelectrically cooled quantum cascade laser based sensor for continuous monitoring of ambient atmospheric CO—AA Koserev, FK Tittel, R Kohler, C Gmachi, F Capasso, DL Sivco, AY Cho, S Wehe and M Allen, 2002, cover and pp. 1-16, Copyright 2002 Optical Society of America (provided in parent U.S. Appl. No. 11/154,264).

Cooke, M., Producing more light than heat from quantum cascade lasers, published on-line Jan. 10, 2010, www.semiconductor-today.com, Semiconductor Today, vol. 5, Issue 1, pp. 106-107, Feb. 2010.

Lincoln Laboratory, News, MIT Lincoln Laboratory creates bright diode lasers, posted on-line Oct. 2009, pp. 1-2, MIT Lincoln Laboratory:News: MIT Lincoln Laboratory creates bright diode lasers, © 2011 Lincoln Laboratory, Massachusetts Institute of Technology.

Lincoln Laboratory, Publications, Lab Notes, Laser Technology, A Bright Idea, Simple tweaks turn into tiny diode lasers into powerhouses, posted on-line Jun. 2010, pp. 1-3, MIT Lincoln Laboratory:Lab Note: A Bright Idea, © 2011 Lincoln Laboratory, Massachusetts Institute of Technology.

Michael Hacskaylo, "Laser Aiming Light," Army Electronics Command Fort Belvoir, VA Night Vision Lab, Jan. 1974, 26 pages, US Department of Commerce, Technology Administration, National Technical Information Service, Springfield, VA 22161.

Lawrence T. Marshall et al., "Integrated Sight,"CECOM RDEC Night Vision and Electronic Sensors Directorate, Fort Belvoir, VA, Texas Instruments, Inc., Plano, TX, Jun. 1997, 8 pages, SPIE vol. 3080, 0277-786X/97, SPIE Digital Library.

T.L. Myers et al., "FY 2005 Quantum Cascade Laser Alignment System Final Report," Dec. 2005, 52 pages, PNNL-15600, Pacific Northwest National Laboratory, prepared for the U.S. Department of Energy.

Joe S. Randella et al., "The Integrated Sight: Future Improvement for Land Warrior," Aug. 1998, pp. 62-72, Proceedings of the SPIE—SPIE vol. 3394, The International Society for Optical Engineering, SPIE Digital Library.

Jacob B. Khurgin et al., "Transport and gain in a quantum cascade laser model and equivalent circuit," Nov. 2010, 9 pages, Optical Engineering 49(11), 111110, SPIE Nov. 2010/vol. 49 (11), © 2010 SPIE, SPIE Digital Library.

Shunt Switched Current Control. Applicant admits that this circuit design is prior art and used more than one year prior to Aug. 16, 2010.

QC Current Regulator. Applicant admits that this circuit design is prior art and used more than one year prior to Aug. 16, 2010.

Thorlabs, Thorlabs.com-Tunable Lasers:Littrow and Littman Prealigned Kits, OFC Information Sheet 2011, http://www.thorlabs.us/newgrouppage9.cfm?objectgroup_id=4757, © 1999-2011 Thorlabs.

Oleksiy Andrusyak et al., External and common-cavity high spectral density beam combining of high power fiber lasers, Jan. 1, 2008, Proc. of SPIE vol. 6873, SPIE Digital Library.

Thomas Schreiber et al., Incoherent Beam Combining of Continuous-Wave and Pulsed Yb-Doped Fiber Amplifiers, Mar. 1, 2009, vol. 15, No. 2, © 2009 IEEE.

Extended Search Report with Annex and the European Search Opinion for European Application No. 10163598.5.0 dated Sep. 23, 2010, Daylight Solutions, Inc.

US 7,733,928, 06/2010, Marsland, Jr. et al. (withdrawn)

* cited by examiner

OPTICAL SWITCH

RELATED INVENTIONS

This application is a continuation-in-part of application Ser. No. 12/780,575, filed May 14, 2010, which is currently pending. As far as permitted, the contents of application Ser. No. 12/780,575 are incorporated herein by reference. Additionally, this application claims priority on U.S. Provisional Application Ser. No. 61/390,260, filed Oct. 6, 2010 and entitled "OPTICAL SWITCH". As far as is permitted, the contents of U.S. Provisional Application Ser. No. 61/390,260 are incorporated herein by reference.

BACKGROUND

Laser sources that generate laser beams are commonly used in many applications, such as testing, measuring, diagnostics, pollution monitoring, leak detection, security, pointer tracking, jamming infrared seeking missile guidance systems, analytical instruments, homeland security and industrial process control.

Often, many systems require multiple laser beams to perform their required functions. Thus, these systems typically require a separate laser source for each of the required laser beams. Unfortunately, providing a separate laser source for each required laser beam can be expensive to manufacture and maintain, and require a significant amount of space. Accordingly, it would be beneficial to provide a compact system that can direct a laser beam from a single laser source in different directions, e.g., toward different optical fiber cables, so that the single laser source can perform the multiple required functions. Additionally, it would be beneficial to provide such a system where the switching of the direction of the beam among the different optical cables can occur at relatively high speed. Further, it would be beneficial to provide such a system that inhibits loss of power during operation.

SUMMARY

The present invention is directed toward an optical fiber switch for alternatively redirecting an input beam along a first redirected axis and along a second redirected axis, the input beam being launched along an input axis and directed along a directed axis. In certain embodiments, the optical switch comprises a redirector and a redirector mover. The redirector is positioned in the path of the input beam along the directed axis. The redirector redirects the input beam so that a redirected beam alternatively launches from the redirector (i) along the first redirected axis that is spaced apart from the directed axis when the redirector is positioned at a first position, and (ii) along the second redirected axis that is spaced apart from the directed axis when the redirector is positioned at a second position that is different from the first position. The redirector mover moves the redirector about a movement axis between the first position and the second position. The redirector mover includes a stator component and a rotor component that moves relative to the stator component. The input beam is directed along the directed axis substantially between the stator component and the redirector prior to the input beam being redirected by the redirector.

In some embodiments, at least one of the stator component and the rotor component includes a component aperture. In such embodiments, the input beam can be directed through the component aperture. Additionally, the component aperture can be coaxial with the movement axis. Further, in one embodiment, the movement axis is substantially coaxial with the directed axis, and the redirector is fixedly coupled to the rotor component. Moreover, in certain embodiments, the redirector includes an input reflective surface that is positioned in the path of the input beam along the directed axis and an output reflective surface that is substantially parallel to and spaced apart from the input reflective surface. In such embodiments, the input reflective surface can be fixedly coupled to the output reflective surface.

In some embodiments, the optical fiber switch further comprises a director having a director reflective surface that directs the input beam from the input axis to the directed axis. In one such embodiment, the optical fiber switch further comprises a window, wherein the input beam passes through the window prior to contacting the director reflective surface, and wherein the director reflective surface is positioned substantially between the stator component and the redirector. Additionally, the director can include a director shaft that extends through the window. Alternatively, in one embodiment, at least one of the stator component and the rotor component can include a component aperture, and the director can include a director shaft that extends through the component aperture. In such embodiment, the director shaft retains the director reflective surface such that the director reflective surface is positioned substantially between the stator component and the redirector. Still alternatively, in one embodiment, the director reflective surface can be secured to the stator component.

In one embodiment, the optical fiber switch further comprises a locking assembly that selectively locks the redirector at the first position and at the second position.

Additionally, the present invention is further directed toward a light source assembly comprising a light source that generates an input beam, and the optical fiber switch as described above that alternatively redirects the input beam along the first redirected axis and the second redirected axis. In one embodiment, the light source assembly further comprises a control system that controls the optical fiber switch to perform individual switching operations within a substantially constant movement time rate regardless of the temperature of the optical fiber switch.

Further, the present invention is also directed toward a method for alternatively redirecting an input beam.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
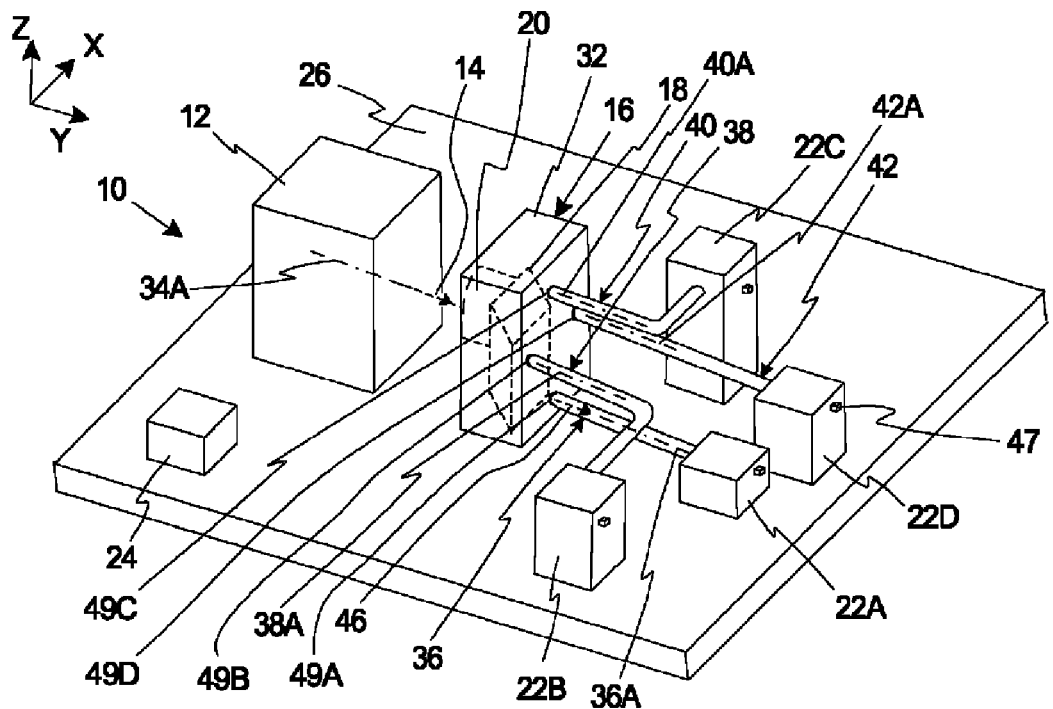
FIG. 1 is simplified perspective view of a light source assembly including a mounting base, and an embodiment of an optical fiber switch having features of the present invention.

FIG. 1 is simplified perspective view of a light source assembly 10, e.g., a laser source assembly, which can be used for many things, including but not limited to testing, measuring, diagnostics, pollution monitoring, leak detection, security, pointer tracking, jamming a guidance system, analytical instruments, homeland security and industrial process control. The design of the light source assembly 10 can be varied to achieve the functional requirements for the light source assembly 10. As shown in the embodiment illustrated in FIG. 1, the light source assembly 10 includes a light source 12, e.g., a laser source, which generates an input beam 14 (illustrated as a dashed arrow); an optical fiber switch 16 including a redirector 18 (illustrated as a box in phantom) and a redirector mover 20 (illustrated in phantom), the optical fiber switch 16 selectively and alternatively directing the input beam 14 to a plurality of different locations 22A, 22B, 22C, 22D (illustrated as boxes); a control system 24 that controls the operation of the light source 12 and the optical fiber switch 16; and a mounting base 26 that retains one or more of these components. It should be noted that in FIG. 1, the light source 12 and the optical fiber switch 16 are shown spaced apart for purposes of clarity and ease of description, and these elements may be closer together in actual use and operation of the light source assembly 10.

Alternatively, the light source assembly 10 can be designed with more or fewer components than are illustrated in FIG. 1 and/or the arrangement of these components can be different than that illustrated in FIG. 1. Further, the relative size and shape of these components can be different than that illustrated in FIG. 1.

A number of Figures include an orientation system that illustrates an X axis, a Y axis that is orthogonal to the X axis, and a Z axis that is orthogonal to the X and Y axes. It should be noted that these axes can also be referred to as the first, second and third axes.

As an overview, the optical fiber switch 16 is uniquely designed to accurately, selectively, and individually direct the input beam 14 to the various locations 22A, 22B, 22C, 22D. As a result thereof, a single light source 12 can be used to alternatively provide the input beam 14 to multiple different devices or components. Additionally, the optical fiber switch 16 is uniquely designed to minimize the space requirements for the optical fiber switch 16 and the laser source assembly 10, and to enable higher switching speeds as the input beam 14 is selectively and alternatively directed toward the various locations 22A, 22B, 22C, 22D. Further, the unique design of the optical fiber switch 16 provides greater flexibility in choosing the redirector mover 20 to quickly and accurately move the redirector 18 so that the input beam 14 is properly directed. Moreover, with the unique optical fiber switch 16 provided herein, the input beam 14 generated by the light source 12 can be selectively directed to the appropriate location 22A, 22B, 22C, 22D with minimal power loss.

Figure 2:
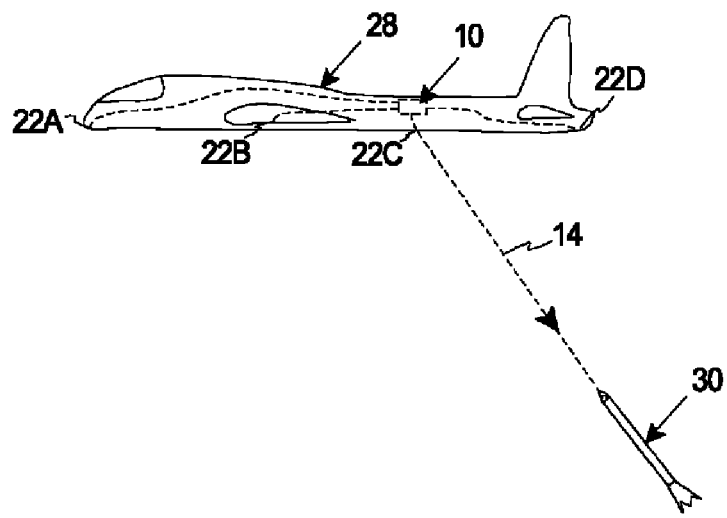
FIG. 2 is a simplified side view of an aircraft including the light source assembly illustrated in FIG. 1.

There are a number of possible usages for the light source assembly 10 disclosed herein. For example, FIG. 2 illustrates that the light source assembly 10 (illustrated in phantom) can be utilized on an aircraft 28 (e.g., a plane or helicopter) as with a pointer tracker system (not shown) for protecting an aircraft from an anti-aircraft missile 30 that may be locked onto the heat emitting from the aircraft 28. The light source assembly 10, i.e. the light source 12 (illustrated in FIG. 1), emits the beam, e.g., the input beam 14 that has been appropriately directed by the optical fiber switch 16 (illustrated in FIG. 1), and the pointer tracker system to cause causes the missile 30 to miss the aircraft 28.

With the present invention, the optical fiber switch 16 can be used to direct the beam 14 to the appropriate location 22A, 22B, 22C, 22B to launch the beam 14 from the desired area of the aircraft 28. With this design, the optical fiber switch 16 can be used to control the location 22A, 22B, 22C, 22B on the aircraft 28 from which the beam 14 is launched depending upon the approach direction of the missile 30 so that the beam 14 can effectively track the path of the missile 30.

It should be noted that the light source assembly 10 can be powered by a generator, e.g. the generator for the aircraft 28, a battery, or another power source.

Referring back to FIG. 1, as provided above, the light source 12 generates the input beam 14, and the light source 12 directs the input beam 14 toward the redirector 18. The design of the light source 12 can be varied to achieve the desired wavelength and output power for the input beam 14. For example, the light source 12 can be designed to generate an input beam 14 that is primarily a single wavelength beam or is primarily a multiple wavelength (incoherent) beam. Thus, the characteristics of the input beam 14 can be adjusted to suit the application for the light source 12.

In one embodiment, the light source 12 can include one or more lasers (not shown) that each generate a beam. In the embodiment with multiple lasers, the individual beams are combined to create the input beam 14. Further, in the design with multiple lasers, each laser can be individually tuned so that a specific wavelength of each beam is the same or so that the specific wavelength of one or more of the beams is different from that of each of the other beams. With this design, the number and design of the lasers can be varied to achieve the desired characteristics of the input beam 14 to suit the application for the light source assembly 10. Thus, the light source 12 can be used to generate a narrow linewidth, accurately settable input beam 14.

In one non-exclusive embodiment, the light source 12 includes one or more mid-infrared ("MIR") lasers (not shown) that each generates a beam having a center wavelength in the MIR range, and one or more non-MIR lasers (not shown) that each generates a beam having a center wavelength that is outside the MIR range, e.g., greater than or less than the MIR range. One example of a suitable MIR laser is a Quantum Cascade laser, and one example of a suitable non-MIR laser is a diode-pumped Thulium-doped fiber laser.

As provided above, the optical fiber switch 16 selectively and alternatively directs the input beam 14 to each of the locations 22A, 22B, 22C, 22D. In one embodiment, the optical fiber switch 16 includes a switch housing 32, the redirector 18, the redirector mover 20, and a plurality of output fibers 36, 38, 40, 42. In one non-exclusive alternative embodiment, the optical fiber switch 16 further includes an input fiber 734 (illustrated in FIG. 7) that transfers and directs the input beam 14 from the light source 12 toward the redirector 18.

The switch housing 32 retains the components of the optical fiber switch 16, including the redirector 18, the redirector mover 20, and a portion of the output fibers 36, 38, 40, 42. The design of the switch housing 32 can be varied to achieve the design requirements of the optical fiber switch 16.

In certain embodiments, the light source 12 generates the input beam 14 such that the input beam 14 is initially directed along an input axis 34A. In one embodiment, as illustrated in FIG. 1, the input axis 34A is substantially parallel to the Y axis. Alternatively, the input axis 34A can be substantially parallel to the X axis, substantially parallel to the Z axis, or in another direction. Additionally, the input beam 14 is directed along a directed axis 344A (illustrated, for example, in FIG. 3A) prior to the input beam 14 being redirected by the redirector 18 toward one of the locations 22A, 22B, 22C, 22D. In one embodiment, the directed axis 344A is substantially coaxial with the input axis 34A. Alternatively, the directed axis 344A can be substantially parallel to the input axis 34A, the directed axis 344A can be substantially perpendicular, e.g., orthogonal, to the input axis 34A, or the directed axis 344A can have a different orientation relative to the input axis 34A. For example, in certain non-exclusive alternative embodiments, (i) the input axis 34A can be substantially parallel to the Y axis and the directed axis 344A can be substantially parallel to the Y axis and coaxial with the input axis 34A; (ii) the input axis 34A can be substantially parallel to the Y axis and the directed axis 344A can be substantially parallel to one of the X axis or the Z axis; (iii) the input axis 34A can be substantially parallel to the X axis and the directed axis 344A can be substantially parallel to one of the Y axis or the Z axis; (iv) the input axis 34A can be substantially parallel to the Z axis and the directed axis 344A can be substantially parallel to one of the X axis or the Y axis.

Moreover, for example, as shown in FIG. 1 and FIGS. 3A-3C, the input beam 14 can be directed along the input axis 34A and along the directed axis 344A without the path of the input beam 14 being altered. Stated another way, in certain embodiments, for example the embodiment illustrated in FIG. 1 and FIGS. 3A-3C, the path of the input beam 14 need not be altered prior to the input beam 14 being redirected by the redirector 18 because the directed axis 344A is coaxial with the input axis 34A. Alternatively, for example, in the embodiments illustrated in FIGS. 4-6, the path of the input beam 14 must be altered from the input axis 434A, 534A, 634A to the directed axis 444A, 544A, 644A, respectively, prior to the input beam 14 being redirected by the redirector 18.

The redirector 18 is positioned along the directed axis 344A in the path of the input beam 14 and can be used to alternatively and selectively direct and steer a redirected beam 46 (illustrated with a dashed arrow in the first output fiber 36) to each of the output fibers 36, 38, 40, 42. The redirector 18 will be described in more detail below.

The redirector mover 20 selectively moves the redirector 18 so that the input beam 14 can be selectively and alternatively directed to each of the locations 22A, 22B, 22C, 22D. The design of the redirector mover 20 can be varied to suit the specific requirements of the light source assembly 10 and/or the optical fiber switch 16. In one, non-exclusive embodiment, the redirector mover 20 is a stepper motor that can precisely move the redirector 18 so that the input beam 14 is precisely directed toward each of the locations 22A, 22B, 22C, 22D. Alternatively, the redirector mover 20 can have a different design.

Additionally, as shown in the embodiment illustrated in FIG. 1, the redirector mover 20 can be positioned substantially between the light source 12 and the redirector 18 along the path of the input beam 14. Further, the redirector mover 20 is positioned on the opposite side of the redirector 18 from the output fibers 36, 38, 40, 42, which enables the user to have access to the output fibers 36, 38, 40, 42 that is unobstructed by the positioning of the redirector mover 20. Alternatively, the redirector mover 20 can have a different positioning relative to the light source 12 and the redirector 18. Particular embodiments of the redirector mover 20 will be described in greater detail herein below.

The output fibers 36, 38, 40, 42 each alternatively receive the redirected beam 46 and can be used to direct the redirected beam 46 from the optical fiber switch 16 to the respective locations 22A, 22B, 22C, 22D. The number and design of the output fibers 36, 38, 40, 42 can be varied to achieve the design requirements of the light source assembly 10. In the embodiment illustrated in FIG. 1, the optical fiber switch 16 includes four, spaced apart output fibers 36, 38, 40, 42 and each of the output fibers 36, 38, 40, 42 is an optical fiber. Alternatively, the optical fiber switch 16 can include greater than or less than four output fibers that can each alternatively receive the redirected beam 46 and can be used to direct the redirected beam 46 from the optical fiber switch 16 to the greater than or less than four locations.

In this embodiment, the output fibers 36, 38, 40, 42 can be labeled as a first output fiber 36, a second output fiber 38, a third output fiber 40, and a fourth output fiber 42. Further, each of the output fibers 36, 38, 40, 42 includes a fiber inlet, e.g., the first output fiber 36 includes a first fiber inlet 36B (illustrated, for example, in FIG. 3A), the second output fiber 38 includes a second fiber inlet 38B (illustrated, for example, in FIG. 3A), the third output fiber 40 includes a third fiber inlet 40B (illustrated, for example, in FIG. 3A), and the fourth output fiber 42 includes a fourth fiber inlet (not illustrated), positioned near the redirector 18. Moreover, in this embodiment, the output fibers 36, 38, 40, 42 are arranged about a circle that is coaxial with the input axis 34A and the directed axis 344A, and the fiber inlets 36B, 38B, 40B for the output fibers 36, 38, 40, 42 are equally spaced apart (e.g., ninety degrees apart).

Additionally, in the embodiment illustrated in FIG. 1, (i) the first fiber inlet 36B for the first output fiber 36 is positioned and aligned along a first output axis 36A; (ii) the second fiber inlet 38B for the second output fiber 38 is positioned and aligned along a second output axis 38A that is spaced apart from and substantially parallel to the first output axis 36A; (iii) the third fiber inlet 40B for the third output fiber 40 is positioned and aligned along a third output axis 40A that is spaced apart from and substantially parallel to the first output axis 36A and the second output axis 38A; and (iv) the fourth fiber inlet for the fourth output fiber 42 is positioned and aligned along a fourth output axis 42A that is spaced apart from and substantially parallel to the first output axis 36A, the second output axis 38A, and the third output axis 40A. Moreover, in this embodiment, the output axes 36A, 38A, 40A, 42A are parallel to the input axis 34A and the directed axis 344A, and are offset an equal distance away from the input axis 34A and the directed axis 344A.

The control system 24 controls the operation of the other components of the light source assembly 10. For example, the control system 24 can include one or more processors and circuits. In certain embodiments, the control system 24 can control the electron injection current to the light source 12, and the control system 24 can control the optical fiber switch 16 to control the position of the redirector 18 and, thus, to control which output fiber 36, 38, 40, 42 is receiving the redirected beam 46.

Additionally, in one embodiment, the control system 24 can include circuitry that enables the optical fiber switch 16 to perform individual switching operations within a desired movement time regardless of the temperature and/or environment in which the light source assembly 10 and/or the optical fiber switch 16 is operating. Ambient and/or operating temperature and/or other environmental differences can tend to cause the optical fiber switch 16 to operate, i.e. perform switching operations, at different speeds and/or within different time frames. Accordingly, the control system 24 can actively monitor the temperature, the pressure, and/or the speed/time (e.g., rotation rate) of switching operations, and the control system 24 can use that information to change the current supplied to the redirector mover 20 in order to effectively adjust the torque required to maintain a substantially constant movement time for switching operations between different locations of the redirector 18.

Additionally, the control system 24 can utilize one or more sensors 47 that can be positioned at or near one or more of the locations 22A, 22B, 22C, 22D. In one embodiment, the sensors 47 can be used as part of a calibration system or operation, where the system is tested to ensure that the output fibers 36, 38, 40, 42 are connected to the correct switch ports on the optical fiber switch 16. More particularly, the system can be tested to ensure that (i) when the input beam 14 is redirected by the redirector 18 toward a first switch port 49A, the redirected beam 46 travels through the first output fiber 36 and is properly directed toward and/or arrives at the first location 22A; (ii) when the input beam 14 is redirected by the redirector 18 toward a second switch port 49B, the redirected beam 46 travels through the second output fiber 38 and is properly directed toward and/or arrives at the second location 22B; (iii) when the input beam 14 is redirected by the redirector 18 toward a third switch port 49C, the redirected beam 46 travels through the third output fiber 40 and is properly directed toward and/or arrives at the third location 22C; and (iv) when the input beam 14 is redirected by the redirector 18 toward a fourth switch port 49D, the redirected beam 46 travels through the fourth output fiber 42 and is properly directed toward and/or arrives at the fourth location 22D.

To the extent that the redirected beam 46 does not travel through the proper output fiber 36, 38, 40, 42 and does not arrive at the proper location 22A, 22B, 22C, 22D, adjustments can be made to ensure that the switch ports 49A, 49B, 49C, 49D, the output fibers 36, 38, 40, 42 and the respective locations 22A, 22B, 22C, 22D are appropriately linked. In one embodiment, the sensors 47 can provide feedback to the control system 24 as to at what location the redirected beam 46 arrived. In certain embodiments, if the redirected beam arrived at the improper location 22A, 22B, 22C, 22D, (i) the attachment of the output fibers 36, 38, 40, 42 can be changed to ensure that the redirected beam 46 arrives at the proper location 22A, 22B, 22C, 22D; or (ii) the control system 24 can be calibrated to ensure that the redirected beam 24 is sent through the proper switch port 49A, 49B, 49C, 49D and/or the proper output fiber 36, 38, 40, 42, in order to arrive at the desired location 22A, 22B, 22C, 22D.

Moreover, in one embodiment, the control system 24 can further utilize an interlock system (not illustrated), e.g., a positive electrical and/or mechanical interlock system, which ensures that power is only directed to the light source 12 when the optical fiber switch 16 is accurately aligned (as determined by the measurement system 382 illustrated in FIG. 3A) with one of the switch ports 49A, 49B, 49C, 49D and/or one of the output fibers 36, 38, 40 42. Stated another way, the control system 24 can utilize the interlock system to inhibit operation of the light source 12 until the measurement system 382 (illustrated in FIG. 3A) indicates that the desired switch port 49A, 49B, 49C, 49D has been reached.

The mounting base 26 provides a rigid platform that supports one or more of the components of the light source assembly 10 and maintains the relative position of the components of the light source assembly 10. In one non-exclusive embodiment, the mounting base 26 includes a plurality of embedded base passageways (not shown) that allow for the circulation of hot and/or cold circulation fluid through the mounting base 26 to maintain the temperature of the mounting base 26 and the components mounted thereon.

Figure 3A:
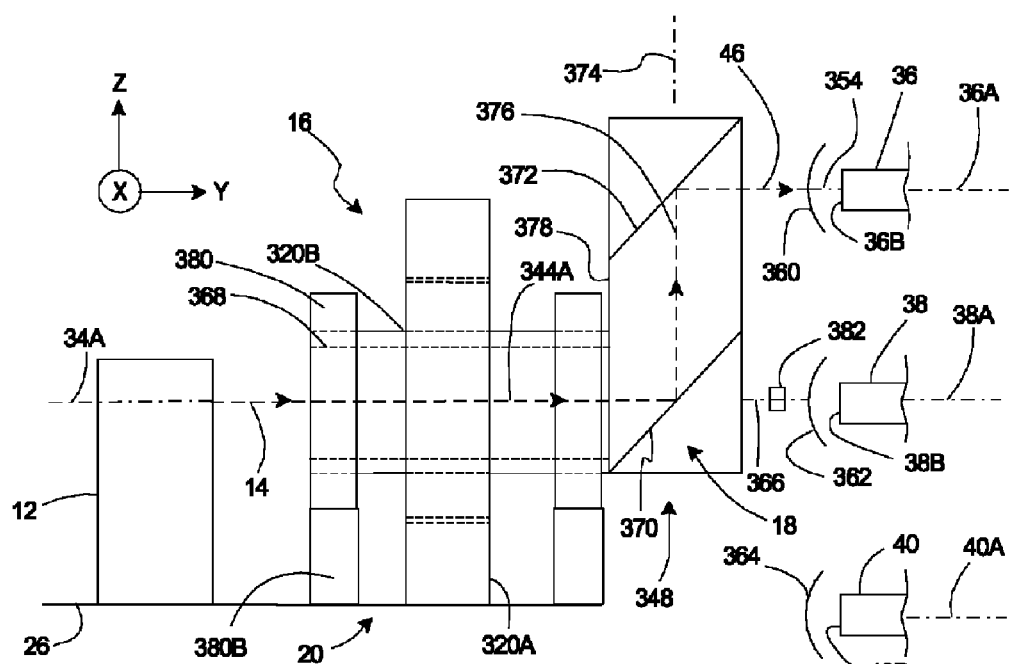
FIG. 3A is a simplified side view of a portion of the mounting base and the optical fiber switch illustrated in FIG. 1, with a redirector of the optical fiber switch positioned in a first position.
Figure 3B:
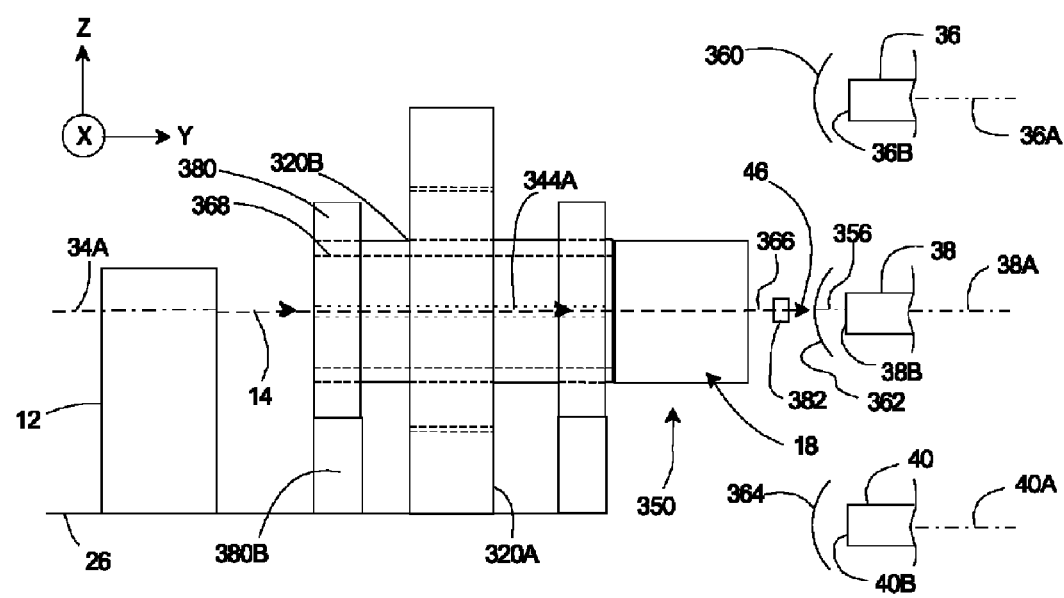
FIG. 3B is a simplified side view of the portion of the mounting base and the optical fiber switch illustrated in FIG. 3A, with the redirector positioned in a second position.
Figure 3C:
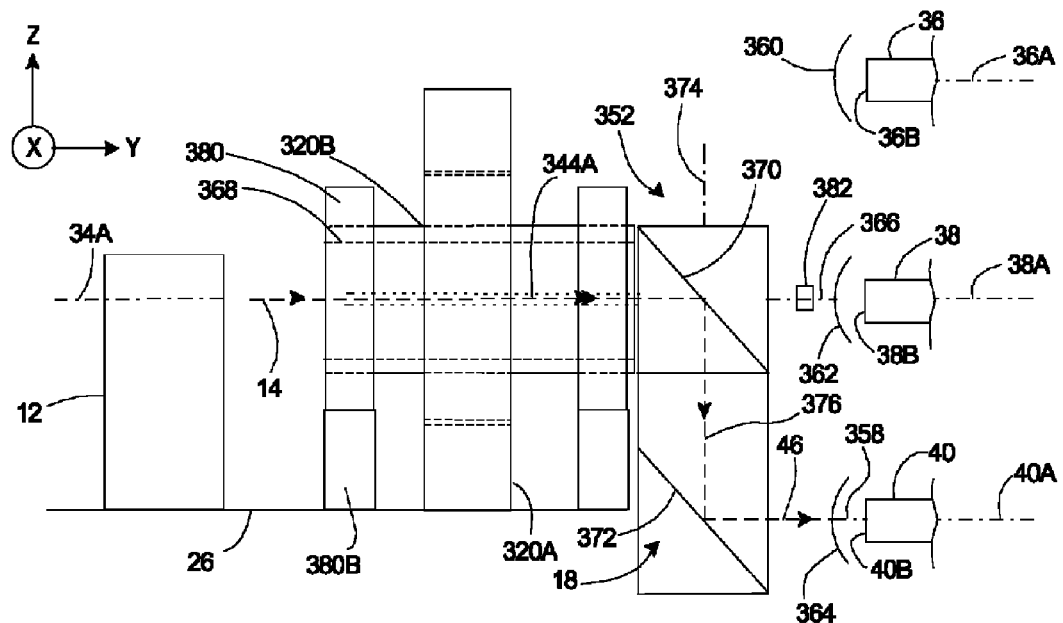
FIG. 3C is a simplified side view of the portion of the mounting base and the optical fiber switch illustrated in FIG. 3A, with the redirector positioned in a third position.

FIGS. 3A-3C illustrate alternative simplified side views of a portion of the mounting base 26 and the optical fiber switch 16 illustrated in FIG. 1, with the redirector 18 being alternatively positioned in a first position 348, a second position 350 that is different from the first position 348, and a third position 352 that is different from the first position 348 and the second position 350. More particularly, FIG. 3A is a simplified side view of the portion of the mounting base 26 and the optical fiber switch 16, with the redirector 18 of the optical fiber switch 16 positioned in the first position 348; FIG. 3B is a simplified side illustration of the portion of the mounting base 26 and the optical fiber switch 16, with the redirector 18 positioned in the second position 350; and FIG. 3C is a simplified side illustration of the portion of the mounting base 26 and the optical fiber switch 16, with the redirector 18 positioned in the third position 352. FIGS. 3A-3C further illustrate various features of an embodiment of the redirector mover 20 and the redirector 18 that is usable as part of the present invention. It should be noted that the switch housing 32 (illustrated in FIG. 1) is not shown in FIGS. 3A-3C so that the other components of the optical fiber switch 16 are more clearly visible. Additionally, it should be noted that in these simplified side views the fourth output fiber 42 (illustrated in FIG. 1) is not visible because it would be positioned directly behind the second output fiber 38.

As shown, the light source 12 is mounted on the mounting base 26. FIGS. 3A-3C illustrate that the light source 12 generates the input beam 14 and directs and/or launches the input beam along the input axis 34A, the input beam 14 being subsequently directed along the directed axis 344A, which in this embodiment is substantially coaxial with the input axis 34A, and toward the redirector 18. Additionally, in this embodiment, the redirector mover 20 is positioned substantially between the light source 12 and the redirector 18. Further, as provided above, the optical fiber switch 16, i.e. the redirector 18, selectively and alternatively directs the input beam 14 to each of the output fibers 36, 38, 40.

Moreover, FIGS. 3A-3C illustrate that the redirector 18 is positioned in the path of the input beam 14. In this embodiment, the redirector 18 redirects the input beam 14 so that the redirected beam 46 (i) launches from the redirector 18 along a first redirected axis 354 that is spaced apart from the directed axis 344A when the redirector 18 is positioned at the first position 348 as illustrated in FIG. 3A; (ii) launches from the redirector 18 along a second redirected axis 356 that is spaced apart from the directed axis 344A when the redirector 18 is positioned at the second position 350 as illustrated in FIG. 3B; (iii) launches from the redirector 18 along a third redirected axis 358 that is spaced apart from the directed axis 344A when the redirector 18 is positioned at the third position 352 as illustrated in FIG. 3C; and (iv) launches from the redirector 18 along a fourth redirected axis (not shown) that is spaced apart from the directed axis 344A when the redirector 32 is positioned at a fourth position (not shown).

In this embodiment, the optical fiber switch 16 is designed so that the redirected axes 354, 356, 358 are equally spaced apart (e.g., ninety degrees apart). Moreover, in this embodiment, the redirected axes 354, 356, 358 are parallel to the directed axis 344A, and are each offset an equal distance away from the directed axis 344A. In particular, in FIGS. 3A-3C, the first redirected axis 354 is offset from the directed axis 344A downward along the Z axis; the second redirected axis 356 is offset from the directed axis 344A (out of the page) along the X axis; the third redirected axis 358 is offset from the directed axis 344A upward along the Z axis; and the fourth redirected axis is offset from the directed axis 344A (into the page) along the X axis.

Further, as shown in FIGS. 3A-3C, (i) the first fiber inlet 36B of the first output fiber 36 is positioned along the first output axis 36A; (ii) the second fiber inlet 38B of the second output fiber 38 is positioned along the second output axis 38A; (iii) the third fiber inlet 40B of the third output fiber 40 is positioned along the third output axis 40A; and (iv) the fourth fiber inlet (not shown) of the fourth output fiber 42 (illustrated in FIG. 1) is positioned along the fourth output axis 42A (illustrated in FIG. 1).

Moreover, (i) the first output axis 36A is coaxial with the first redirected axis 354 so that when the redirected beam 46 is directed by the redirector 18 along the first redirected axis 354 as shown in FIG. 3A, the redirected beam 46 is directed at the first fiber inlet 36B; (ii) the second output axis 38A is coaxial with the second redirected axis 356 so that when the redirected beam 46 is directed by the redirector 18 along the second redirected axis 356 as shown in FIG. 3B, the redirected beam 46 is directed at the second fiber inlet 38B; (iii) the third output axis 40A is coaxial with the third redirected axis 358 so that when the redirected beam 46 is directed by the redirector 18 along the third redirected axis 358 as shown in FIG. 3C, the redirected beam 46 is directed at the third fiber inlet 40B; and (iv) the fourth output axis 42A is coaxial with the fourth redirected axis so that when the redirected beam 46 is directed by the redirector 18 along the fourth redirected axis, the redirected beam 46 is directed at the fourth fiber inlet.

Additionally, the optical fiber switch 16 can include (i) a first coupling lens 360 that is positioned on the first redirected axis 354 between the redirector 18 and the first fiber inlet 36B when the redirector 18 is in the first position 348, the first coupling lens 360 focusing the redirected beam 46 at the first fiber inlet 36B when the redirector 18 is in the first position 348; (ii) a second coupling lens 362 that is positioned on the second redirected axis 356 between the redirector 18 and the second fiber inlet 38B when the redirector 18 is in the second position 350, the second coupling lens 362 focusing the redirected beam 46 at the second fiber inlet 38B when the redirector 18 is in the second position 350; (iii) a third coupling lens 364 that is positioned on the third redirected axis 358 between the redirector 18 and the third fiber inlet 40B when the redirector 18 is in the third position 352, the third coupling lens 364 focusing the redirected beam 46 at the third fiber inlet 40B when the redirector 18 is in the third position 352; and (ii) a fourth coupling lens (not shown) that is positioned on the fourth redirected axis between the redirector 18 and the fourth fiber inlet when the redirector 18 is in the fourth position, the fourth coupling lens focusing the redirected beam 46 at the fourth fiber inlet when the redirector 18 is in the fourth position.

In one embodiment, each coupling lens 360, 362, 364 is a lens (either spherical or aspherical) having an optical axis that is aligned with the respective redirected axis 354, 356, 358. In one embodiment, to achieve the desired small size and portability, each coupling lens 360, 362, 364 has a relatively small diameter. In alternative, non-exclusive embodiments, each coupling lens 360, 362, 364 has a diameter of less than approximately 10 or 15 millimeters, and a focal length of approximately 1, 2, 3, 4, 5, 6, 7, 8, 9, 10, 11, 12, 13, 14, 15, 16, 17, 18, 19, 20, 21, 22, 23, 24 or 25 mm and any fractional values thereof. The materials used for the coupling lens 360, 362, 364 are selected to be effective for the wavelength(s) of the redirected beam 46. The coupling lens 360, 362, 364 can be designed to have a numerical aperture (NA) which matches that of the respective output fiber 36, 38, 40, 42. In one embodiment, each coupling lens 360, 362, 364 is secured to the switch housing 32.

In certain embodiments, each fiber inlet 36B, 38B, 40B includes a facet that is coated with an AR (anti-reflection) material. The AR coating allows the redirected beam 46 to easily enter the respective facet and facilitates the entry of the redirected beam 46 into the respective output fiber 36, 38, 40, 42. This improves the efficiency of the coupling between the respective coupling lens 360, 362, 364 and its corresponding output fiber 36, 38, 40, and reduces the amount of heat that is generated at the respective fiber facet. Further, the AR coating ensures that the majority of the power generated by the light source 12 is transferred to the respective output fiber 36, 38, 40, 42, which improves the overall efficiency of the optical fiber switch 16.

In one embodiment, the AR coating has a relatively low reflectivity at the wavelength(s) of the redirected beam 46. In alternative, non-exclusive embodiments, the AR coating can have a reflectivity of less than approximately 1, 2, 3, 4, or 5 percent for the wavelength(s) of the redirected beam 46.

The materials utilized and the recipe for each of the coatings can be varied according to the wavelengths of the redirected beam 46. Suitable materials for the coatings include silicone, germanium, metal-oxides, and/or metal flourides. Further, the recipe for each of the coatings can be developed using the commercially available coating design program sold under the name "The Essential Macleod", by Thin Film Center Inc., located in Tucson, Ariz.

The redirector mover 20 precisely moves the redirector 18 about a movement axis 366 so that the redirector 18 is alternatively positioned in the first position 348, the second position 350, the third position 352, and the fourth position, so that the redirector 18 can redirect the input beam 14 alternatively along the first redirected axis 354, the second redirected axis 356, the third redirected axis 358, and the fourth redirected axis, respectively. The design of the redirector mover 20 can be varied to suit the specific design requirements of the light source assembly 10 (illustrated in FIG. 1) and/or the optical fiber switch 16. In this embodiment, the redirector mover 20 includes a first mover component 320A and a second mover component 320B that interact with one another to move the redirector 18 as desired. Further, the redirector mover 20 is positioned on the input side of the redirector 18.

In the embodiment illustrated in FIG. 3A-3C, the first mover component 320A is annular ring shaped and is positioned substantially about the second mover component 320B. Additionally, the second mover component 320B is shaped as a cylindrical shaft that extends through the first mover component 320A. Further, in this embodiment, the first mover component 320A is fixedly coupled to the mounting base 26, and the second mover component 320B is adapted to move relative to the first mover component 320A. Accordingly, in this embodiment, the first mover component 320A can be referred to generally as and/or functions as the fixed component or stator component, and the second mover component 320B can be referred to generally as and/or functions as the moving component or rotor component.

In one embodiment, the first mover component 320A can include one or more coils (not illustrated) and the second mover component 320B can include one or more magnets (not illustrated) that interact with one another to move the redirector 18. More particularly, during use of the redirector mover 20, the control system 24 (illustrated in FIG. 1) selectively energizes one or more of the coils of the first mover component 320A, and the second mover component 320B, i.e. the magnets, align themselves with the magnetic field produced by the energized coils of the first mover component 320A, thus producing the rotational movement of the second mover component 320B relative to the first mover component 320A. Alternatively, the first mover component 320A and the second mover component 320B can have different shapes, different designs, and/or the functions of the first mover component 320A and the second mover component 320B can be reversed. For example, in certain non-exclusive alternative embodiments, the first mover component 320A can include one or more magnets and the second mover component 320B can include one or more coils, and/or the first mover component 320A can function as the moving component or rotor component and the second mover component 320B can function as the fixed component or stator component of the redirector mover 20.

It should be noted that the specific labeling of the first mover component and the second mover component is merely for convenience of description, and either mover component can be described as the first mover component and/or the second mover component.

Further, in this embodiment, the redirector 18 is fixedly coupled to and/or is integrally formed with the second mover component 320B, i.e. with the moving component. With this design, movement, e.g., rotation, of the second mover component 320B relative to the first mover component 320A results in the corresponding movement, e.g., rotation, of the redirector 18 about the movement axis 366. Thus, the redirector 18 can effectively function as a periscope-type redirector. In certain embodiments, such as illustrated in FIGS. 3A-3C, the movement axis 366 is coaxial with the directed axis 344A and can be coaxial with the input axis 34A. Alternatively, in an embodiment where the first mover component 320A is adapted to move relative to the second mover component 320B, the redirector 18 can be fixedly coupled to and/or integrally formed with the first mover component 320A.

Additionally, in one embodiment, the weight of the redirector 18 can be distributed such that the redirector 18 is balanced about the movement axis 366. With this design, when the optical fiber switch 16 is subjected to outside forces, e.g., vibrations, the balanced weighting of the redirector 18 will inhibit the outside forces from generating a rotational force on the redirector 18 and/or the redirector mover 20. Stated another way, with this design, outside forces, such as vibrations, will produce substantially zero net rotational force on the redirector 18 and/or the redirector mover 20.

As shown in the embodiment illustrated in FIGS. 3A-3C, the second mover component 320B can include a component aperture 368 (illustrated with dotted lines) that is substantially centrally located within the second mover component 320B and which extends substantially the entire length of the second mover component 320B. In one embodiment, the component aperture 368 is has a generally circular shaped cross-sectional shape and extends the length of the second mover component 320B. For example, the component aperture 368 can have a diameter of ten millimeters. Alternatively, the component aperture 368 can have another shape.

Moreover, the component aperture 368 can be coaxial with the directed axis 344A and/or the movement axis 366. With this design, the input beam 14 can be directed along the input axis 34A, into and/or through the component aperture 368, and subsequently directed along the directed axis 344A prior to the input beam 14 being redirected by the redirector 18. Moreover, as illustrated, the input beam 14 is directed along the directed axis 344A substantially between the first mover component 320A, i.e. the fixed component, and the redirector 18 prior to the input beam 14 being redirected by the redirector 18. Stated another way, the input beam 14 is directed along the directed axis 344A on an input side of the redirector 18 prior to the input beam 14 being redirected by the redirector 18.

Additionally, in one embodiment, the optical fiber switch 16 can further include a locking assembly 369 (illustrated in FIG. 3D) that selectively locks the redirector mover 20 and/or the redirector 18, as the redirector mover 20 selectively and alternatively positions the redirector 18 at the first position 348, the second position 350, the third position 352, and the fourth position.

Moreover, the design of the redirector 18 and the redirector mover 20 enables the optical fiber switch 16 to be more compact because the length of the redirector 18, i.e. the length of the periscope, will depend largely on the size and number of output locations 22A, 22B, 22C, 22D (illustrated in FIG. 1), and not on the diameter of the redirector mover 20. More specifically, by directing the input beam 14 along the directed axis 344A, which is coaxial with the movement axis 366 of the redirector 18, and by positioning the redirector mover 20 on the input side of the redirector 18 as illustrated and described herein, the diameter of the redirector mover 20 is no longer a limitation on the length of the redirector 18, i.e. the length of the periscope. This ability to utilize a shorter redirector 18, i.e. a shorter periscope, reduces the inertia of the redirector 18 during switching operations, which further enables higher switching speeds to be achieved. Another advantage of the present design is the increased flexibility in choosing the redirector mover 20.

The design of the redirector 18 can be varied pursuant to the teachings provided herein. In one embodiment, the redirector 18 includes an input reflective surface 370 that is positioned along the directed axis 344A in the path of the input beam 14, and an output reflective surface 372 that is substantially parallel to (in parallel planes) and spaced apart from the input reflective surface 370 along a redirector longitudinal axis 374 (illustrated in FIG. 3A) that is perpendicular to the directed axis 344A. In this embodiment, each reflective surface 370, 372 is adapted to reflect the beam 14. For example, the input reflective surface 370 can redirect the input beam 14 approximately ninety degrees, and the output reflective surface 372 can redirect an intermediate beam 376 that is reflected off of the input reflective surface 370 approximately ninety degrees. In this embodiment, the input reflective surface 370 is at an angle of approximately forty-five degrees relative to the input beam 14, and the output reflective surface 372 is at an angle of approximately forty-five degrees relative to both the intermediate beam 376 and the redirected beam 46. With this design, in this embodiment, the redirected beam 46 is parallel and spaced apart from the input beam 14. Moreover, the input reflective surface 370 can be fixedly coupled to the second reflective surface 372 so that they are move concurrently during movement of the redirector 18 about the movement axis.

For example, in one embodiment, the redirector 18 can be a monolithic, rectangular shaped prism, with the parallel reflective surfaces 370, 372 (e.g., mirrors) defining the opposed ends of the prism. Further, in this embodiment, in addition to the reflective surfaces 370, 372 that define the opposed ends, the prism includes four sides 378 that extend between the reflective surfaces 370, 372. Alternatively, for example, the redirector 18 can be made from two parallel, spaced apart reflective surfaces 370, 372 that are fixedly secured together.

In certain non-exclusive, alternative embodiments, the redirector 18 can be made of germanium, zinc selenide, silicone, calcium fluoride, barium fluoride or chalcogenide glass. The working surfaces can be coated or uncoated (relying on internal total reflection).

As provided above, in this embodiment, the input beam 14 impinges on the input reflective surface 370 at an angle of approximately forty-five degrees, and the redirected beam 46 exits from the output reflective surface 372 at an angle of approximately forty-five degrees.

Further, as provided above, in certain embodiments, the redirector 18 is rotated about the movement axis 366 that is coaxial with the directed axis 344A (where the input beam 14 impinges the input reflective surface 370) during movement of the redirector 18 between the positions 348, 350, 352. With this design, the input beam 14 impinges at the same location on the input reflective surface 370 irrespective of the position 348, 350, 352 of the redirector 18. In this embodiment, the directed axis 344A is parallel to the Y axis. It should be noted that with this design of the redirector 18, any minor spatial/angular displacement of the redirector 18 (e.g., about the Z axis or about the X axis) shifts the beam 14 in space while preserving the propagation direction. Moreover, small shifts in space while preserving the propagation direction are allowable without losses of power. This allows for looser tolerances in the manufacture of the optical fiber switch 16 and a less expensive to make optical fiber switch 16.

Additionally, as illustrated in FIGS. 3A-3C, the optical fiber switch 16 can further include a redirector guide 380 and a measurement system 382 (each illustrated as a box).

The redirector guide 380 guides the movement of the redirector 18 relative to the input beam 14 and the output fibers 36, 38, 40, 42. As one non-exclusive embodiment, the redirector guide 380 includes one or more bearings that allow the redirector 18 to be rotated about the movement axis 366, while inhibiting all other movement of the redirector 18. For example, as illustrated in FIGS. 3A-3C, a bearing can be positioned at or near either end of the second mover component 320B such that the redirector 18 can be effectively rotated about the movement axis 366, as desired, while all other movement of the redirector 18, e.g., along and about the axes, is inhibited. Additionally, the redirector guide 380, i.e. each of the bearings, is fixedly coupled to the mounting base 26 with a mounting bracket 380B.

In FIGS. 3A-3C, as provided above, the movement axis 366 is coaxial with the directed axis 344A (and the input axis 34A). As a result thereof, in this embodiment, the redirector 18 rotates about the directed axis 344A (and the input axis 34A) between the positions 348, 350, 352. Alternatively, in one embodiment, the redirector guide 380, i.e. the bearings, can be integrated into and sealed within the redirector mover 20. In such embodiment, the redirector guide 380 effectively forms a part of a sealed motor.

The measurement system 382 monitors the rotational position of the redirector 18 and provides feedback to the redirector mover 20 so that the redirector mover 20 can accurately position the redirector 18. In one, non-exclusive embodiment, the measurement system 382 is a rotary encoder. Additionally, in one embodiment, the optical fiber switch 16 can further utilize an electronic or optical index position that further enhances the ability to provide precise positional calibration for the redirector mover 20 and the redirector 18.

Figure 3D:
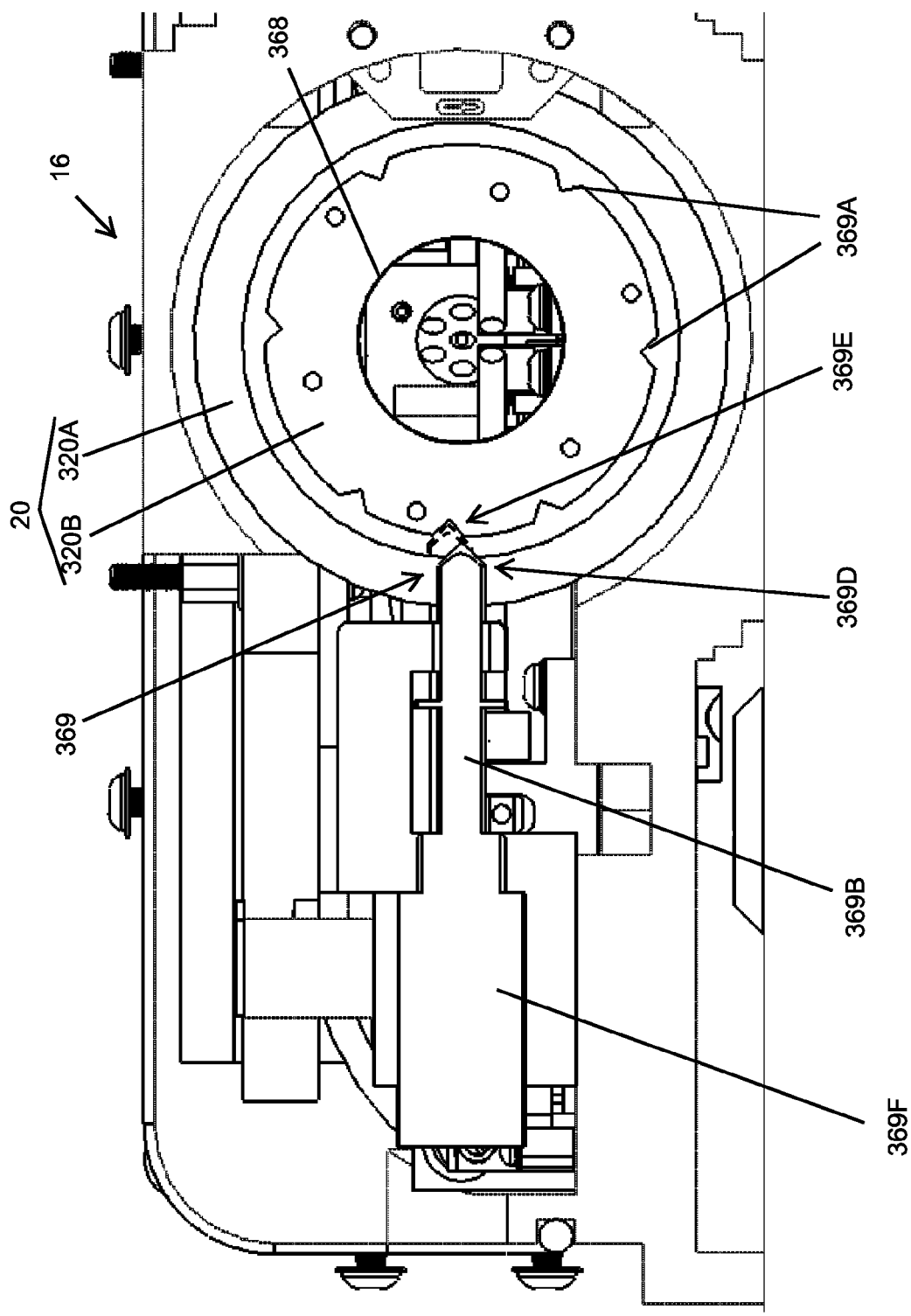
FIG. 3D is an illustration of portion of the optical fiber switch having features of the present invention.

FIG. 3D is an end view of a portion of the optical fiber switch 16. In particular, FIG. 3D illustrates one non-exclusive embodiment of a locking assembly 369 that can be utilized as part of the optical fiber switch 16 illustrated in FIGS. 3A-3C or in the other optical switches disclosed herein. It should be noted that the locking assembly 369 can be implemented before or near the redirector mover 20, between the redirector mover 20 and the redirector 18, or after the redirector 18.

Additionally, FIG. 3D further illustrates the component aperture 368 that is substantially centrally located within the second mover component 320B and which extends substantially the entire length of the second mover component 320B.

As noted above, the locking assembly 369 selectively locks the redirector mover 20 and/or the redirector 18 (illustrated in FIG. 3A), as the redirector mover 20 selectively and alternatively positions the redirector 18 at the first position 348 (illustrated in FIG. 3A), the second position 350 (illustrated in FIG. 3B), the third position 352 (illustrated in FIG. 3C), and the fourth position. The design of the locking assembly 369 can be varied. In the embodiment illustrated in FIG. 3D, the locking assembly 369 includes a plurality of grooves 369A and a locking arm 369B.

As illustrated, the second mover component 320B, i.e. the rotor component, can include the plurality of grooves 369A that are spaced apart around the circumference of the second mover component 320B. More particularly, the plurality of grooves 369A are positioned around the circumference of the second mover component 320B such that one of the grooves 369A is substantially aligned with the locking arm 369B for each of the positions of the redirector 18. Stated another way, when the redirector mover 20 selectively and alternatively positions the redirector 18 in the first position 348, the second position 350, the third position 352, and the fourth position, in each position 348, 350, 352, the grooves 369A are positioned such that the locking arm 369B can be moved so that a portion of the locking arm 369B is positioned within one of the grooves 369A.

During use, the locking arm 369B is selectively movable by an arm mover 369F (e.g. a solenoid or other type of actuator) between (i) a disengaged position 369D (illustrated as solid lines in FIG. 3D), in which the redirector mover 20 can move and selectively and alternatively position the redirector 18 in the first position 348, the second position 350, the third position 352, and the fourth position; and (ii) an engaged position 369E (illustrated in phantom in FIG. 3D), in which a portion of the locking arm 369B is positioned within one of the grooves 369A, thereby inhibiting rotation of the redirector mover 20 and thus movement, i.e. rotation, of the redirector 18 between the positions 348, 350, 352. In different embodiments, the locking arm 369B can be positioned away from the first mover component 320A, i.e. the stator component, or the locking arm 369B can extend through an aperture in the first mover component 320A.

It should be noted that a locking assembly 369, such as illustrated and described herein, can be applicable with any of the embodiments of the optical fiber switch 16 provided in the present application.

Additionally, it should be noted that use of the locking assembly 369, as illustrated and described herein, provides certain benefits to the optical fiber switch 16 and/or to the light source assembly 10 (illustrated in FIG. 1). For example, use of the locking assembly 369 can ensure the retention of the position of the redirector mover 20 and the redirector 18 under loss of system power conditions. Further, the overall power requirements for the light source assembly 10 can be reduced as the redirector mover 20 only needs to be powered during movement of the redirector 18 between the positions 348, 350, 352. Moreover, reduction of EMI/EMF of the coils of the first mover component 320A can be realized by only powering the redirector mover 20 during movement of the redirector 18 between the positions 348, 350, 352.

Figure 4:
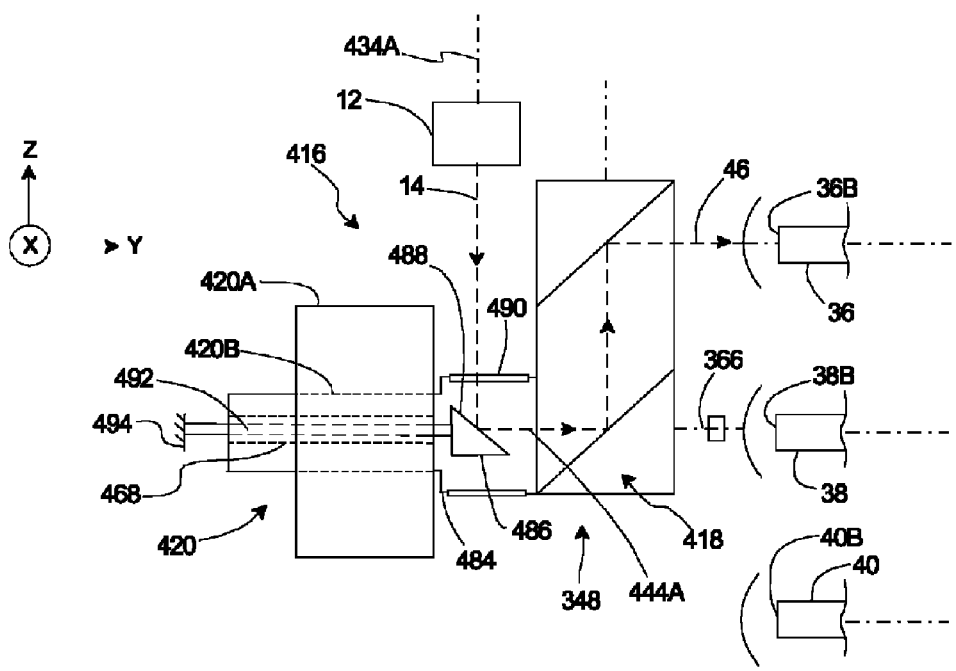
FIG. 4 is a simplified side view of a portion of another embodiment of the optical fiber switch having features of the present invention.

FIG. 4 is a simplified side view of a portion of another embodiment of the optical fiber switch 416 having features of the present invention. It should be noted that the redirector guide 380 and the mounting base 26 have been omitted from FIG. 4 for purposes of clarity. As illustrated, the optical fiber switch 416 is somewhat similar to the optical fiber switch 16 illustrated and described in detail above in relation to FIGS. 3A-3C. For example, the redirector 418 is substantially similar in design and function to the redirector 18 illustrated and described above. As with the previous embodiment, the redirector 418 can be alternatively positioned in the first position 348 (as illustrated in FIG. 4), the second position 350 (illustrated in FIG. 3B), the third position 352 (illustrated in FIG. 3C), and the fourth position (not illustrated). Additionally, the light source 12 again launches and directs the input beam 14 along the input axis 434A toward the redirector 418, and the redirector 418 again redirects the input beam 14 so that the redirected beam 46 is selectively and alternatively redirected toward (i) the first fiber inlet 36B of the first output fiber 36 when the redirector is positioned in the first position 348, (ii) the second fiber inlet 38B of the second output fiber 38 when the redirector is positioned in the second position 350, (ii) the third fiber inlet 40B of the third output fiber 40 when the redirector is positioned in the third position 352, and (iv) the fourth fiber inlet (not illustrated) of the fourth output fiber 42 (illustrated in FIG. 1) when the redirector is positioned in the fourth position.

Further, in the embodiment illustrated in FIG. 4, the redirector mover 420 again includes a first mover component 420A and a second mover component 420B that interact with one another to move the redirector 418 as desired. Moreover, during use of the redirector mover 420, the second mover component 420B is adapted to move, e.g., rotate, relative to the first mover component 420A. Accordingly, in this embodiment, the first mover component 420A can again be referred to generally as and/or function as the fixed component or stator component, and the second mover component 420B can again be referred to generally as and/or function as the moving component or rotor component. Still further, the redirector 418 can again be fixedly coupled to and/or can be integrally formed with the second mover component 420B, i.e. the moving component. For example, as illustrated in FIG. 4, the optical fiber switch 416 further includes a coupler 484 that fixedly couples the second mover component 420B to the redirector 418. Alternatively, the optical fiber switch 416 can be designed without the coupler 484 and the second mover component 420B can be directly secured to the redirector 418.

In one embodiment, the coupler 484 can be substantially tubular shaped

With the design as illustrated herein, movement, e.g., rotation, of the second mover component 420B relative to the first mover component 420A again results in the corresponding movement, e.g., rotation, of the redirector 418 about the movement axis 366. Moreover, as illustrated, the input beam 14 is again directed along the directed axis 444A substantially between the first mover component 420A, i.e. the fixed component, and the redirector 418 prior to the input beam 14 being redirected by the redirector 418. Stated another way, the input beam 14 is directed along the directed axis 444A on an input side of the redirector 418 prior to the input beam 14 being redirected by the redirector 418.

However, in this embodiment, the input axis 434A is substantially perpendicular to the movement axis 366 of the redirector 418. Thus, in the embodiment illustrated in FIG. 4, the optical fiber switch 416 also includes a director 486, e.g., a mirror, that directs the input beam 14 from the input axis 434A so that the input beam 14 is properly directed along a directed axis 444A prior to the input beam 14 being redirected by the redirector 418. More particularly, the director 486 includes a director reflective surface 488 that directs the input beam 14 from the input axis 434A to the directed axis 444A. For example, as illustrated in FIG. 4, the director reflective surface 488 can be positioned in the path of the input beam 14 substantially between the redirector mover 20, i.e. the first mover component 420A and/or the second mover component 420B, and the redirector 418. In one embodiment, the director reflective surface 488 is positioned at an angle of approximately forty-five degrees relative to the input beam 14 as the input beam 14 moves along the input axis 434A, such that the input beam 14 will be reflected or directed by approximately ninety degrees from the input axis 434A to the directed axis 444A. As with the previous embodiment, the directed axis 444A is coaxial with the movement axis 366.

Additionally, to enable the input beam 14 to necessarily contact the director reflective surface 488, the coupler 484 includes one or more coupler windows 490 or openings (only two are illustrated in FIG. 4 for purposes of clarity). For example, in certain non-exclusive alternative embodiments, the coupler 484 can include one window that extends substantially, if not entirely, around the perimeter of the coupler 484, or the coupler 484 can include an individual window 490 being positioned so as to allow the input beam 14 to pass through the window 490 when the redirector 418 is alternatively positioned in the first position 348, the second position 350, the third position 352 or the fourth position. With this design, as the input beam 14 is directed along the input axis 434A, the input beam 14 passes through one of the coupler windows 490 prior to contacting the director reflective surface 488. Alternatively, in one embodiment, the second mover component 420B can include one or more component windows (not illustrated) or openings, and the input beam 14 can pass through one of the component windows prior to contacting the director reflective surface 488. It should be noted that as utilized herein, the term "window" is intended to comprise any configuration wherein the input beam 14 can effectively pass through the "window". For example, in certain non-exclusive alternative embodiments, the "window" can be an opening or the "window" can comprise any material that is substantially transparent to the propagation of the input beam 14.

Further, in this embodiment, the director reflective surface 488 is secured to or otherwise mounted on a director shaft 492. Stated another way, the director shaft 492 retains the director reflective surface 488. Moreover, in this embodiment, the director shaft 492 extends through a component aperture 468 in the second mover component 420B, which extends substantially the entire length of the second mover component 420B. The director shaft 492 is further fixedly secured to a director support surface 494 that is positioned spaced apart from the second mover component 420B. With this design, the director reflective surface 488 is consistently maintained at the proper angle relative to the input axis 434A so as to properly and accurately direct the input beam 14 along the directed axis 444A prior to the input beam 14 being redirected by the redirector 418.

As with the previous embodiment, by directing the input beam 14 along the directed axis 444A, which is coaxial with the movement axis 366, and by positioning the redirector mover 420 on the input side of the redirector 418 as illustrated and described herein, various design advantages can be realized. For example, the diameter of the redirector mover 420 is no longer a limitation on the length of the redirector 418, i.e. the length of the periscope, which enables the optical fiber switch 416 to be more compact, reduces the inertia of the redirector 418 during switching operations, enables higher switching speeds to be achieved, and provides increased flexibility in choosing the redirector mover 420.

Figure 5:
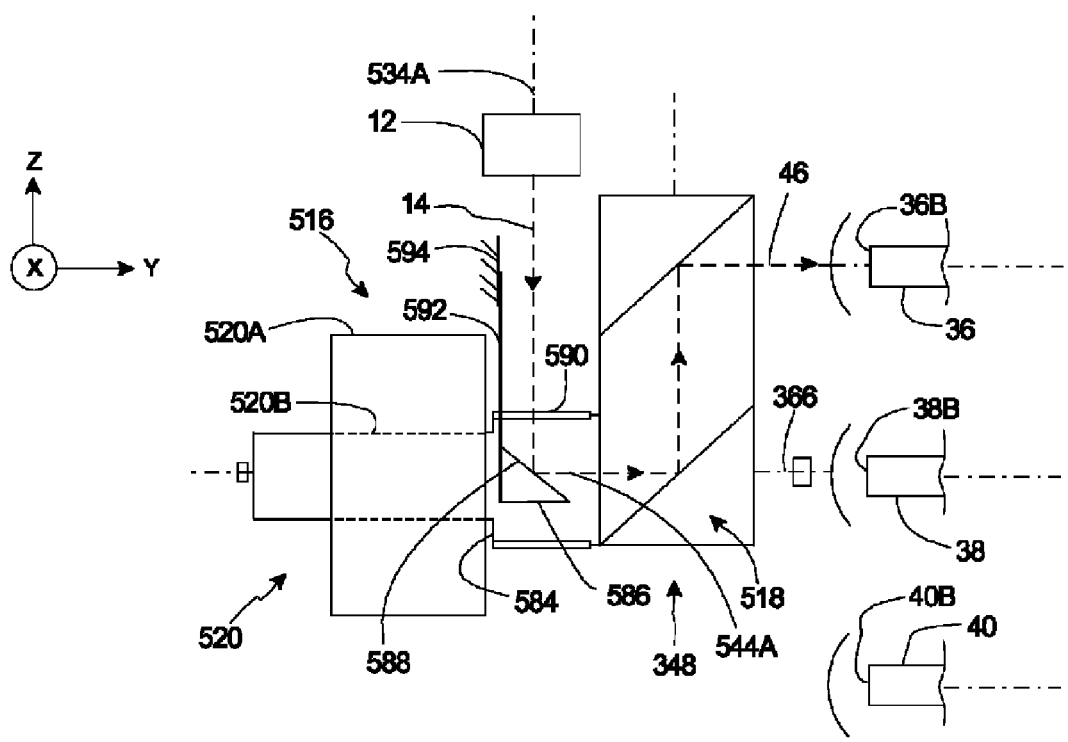
FIG. 5 is a simplified side view of a portion of still another embodiment of the optical fiber switch having features of the present invention.

FIG. 5 is a simplified side view of a portion of still another embodiment of the optical fiber switch 516 having features of the present invention. It should be noted that the redirector guide 380 and the mounting base 26 have been omitted from FIG. 5 for purposes of clarity. As illustrated, the optical fiber switch 516 is somewhat similar to the optical fiber switches 16, 416 illustrated and described in detail above. For example, the redirector 518 is substantially similar in design and function to the redirectors 18, 418 illustrated and described above. As with the previous embodiments, the redirector 518 can be alternatively positioned in the first position 348 (as illustrated in FIG. 5), the second position 350 (illustrated in FIG. 3B), the third position 352 (illustrated in FIG. 3C), and the fourth position (not illustrated). Additionally, the light source 12 again launches and directs the input beam 14 along the input axis 534A toward the redirector 518, and the redirector 518 again redirects the input beam 14 so that the redirected beam 46 is selectively and alternatively redirected toward (i) the first fiber inlet 36B of the first output fiber 36 when the redirector is positioned in the first position 348, (ii) the second fiber inlet 38B of the second output fiber 38 when the redirector is positioned in the second position 350, (ii) the third fiber inlet 40B of the third output fiber 40 when the redirector is positioned in the third position 352, and (iv) the fourth fiber inlet (not illustrated) of the fourth output fiber 42 (illustrated in FIG. 1) when the redirector is positioned in the fourth position.

Further, in the embodiment illustrated in FIG. 5, the redirector mover 520 again includes a first mover component 520A and a second mover component 520B that interact with one another to move the redirector 518 as desired. Moreover, during use of the redirector mover 520, the second mover component 520B is adapted to move, e.g., rotate, relative to the first mover component 520A. Accordingly, in this embodiment, the first mover component 520A can again be referred to generally as and/or function as the fixed component or stator component, and the second mover component 520B can again be referred to generally as and/or function as the moving component or rotor component. Still further, in this embodiment, the redirector 518 can again be fixedly coupled to and/or can be integrally formed with the second mover component 520B, i.e. the moving component. For example, as illustrated in FIG. 5, the optical fiber switch 516 further includes a coupler 584 that fixedly couples the second mover component 520B to the redirector 518. With this design, movement, e.g., rotation, of the second mover component 520B relative to the first mover component 520A again results in the corresponding movement, e.g., rotation, of the redirector 518 about the movement axis 366. Moreover, as illustrated, the input beam 14 is again directed along the directed axis 544A substantially between the first mover component 520A, i.e. the fixed component, and the redirector 518 prior to the input beam 14 being redirected by the redirector 518. Stated another way, the input beam 14 is directed along the directed axis 544A on an input side of the redirector 518 prior to the input beam 14 being redirected by the redirector 518.

Similar to the embodiment illustrated in FIG. 4, in this embodiment, the input axis 534A is substantially perpendicular to the movement axis 366 of the redirector 518. Thus, in the embodiment illustrated in FIG. 5, the optical fiber switch 516 also includes a director 586, e.g., a mirror, that directs the input beam 14 from the input axis 534A so that the input beam 14 is properly directed along a directed axis 544A prior to the input beam 14 being redirected by the redirector 518. More particularly, the director 586 includes a director reflective surface 588 that directs the input beam 14 from the input axis 534A to the directed axis 544A. In one embodiment, the director reflective surface 588 is positioned at an angle of approximately forty-five degrees relative to the input beam 14 as the input beam 14 moves along the input axis 534A, such that the input beam 14 will be reflected or directed by approximately ninety degrees from the input axis 534A to the directed axis 544A. As with the previous embodiments, the directed axis 544A is coaxial with the movement axis 366.

Additionally, to enable the input beam 14 to necessarily contact the director reflective surface 588, the coupler 584 includes one or more coupler windows 590. With this design, as the input beam 14 is directed along the input axis 534A, the input beam 14 passes through one of the coupler windows 590 prior to contacting the director reflective surface 588. Alternatively, in one embodiment, the second mover component 520B can include one or more component windows (not illustrated), and the input beam 14 can pass through one of the component windows prior to contacting the director reflective surface 588.

Further, the director reflective surface 588 is mounted on a director shaft 592 that extends through one of the coupler windows 590 of the coupler 584. In this embodiment, since the director shaft 592 extends through one of the coupler windows 590, i.e. through a slot in one of the coupler windows 590, the coupler window 590 provides a limitation on the extent of rotation that may be achieved with the coupler 584. Accordingly, a corresponding limitation exists on the extent of rotation of the redirector 518 that is coupled to the redirector mover 520 via the coupler 584. Therefore, the coupler window 590 needs to be sufficiently large about a perimeter of the coupler 584 so as to not too greatly limit the extent of rotation of the redirector 518. Moreover, the director shaft 592 is fixedly secured to a director support surface 594 that is positioned spaced apart from the second mover component 520B. With this design, the director reflective surface 588 is consistently maintained at the proper angle relative to the input axis 534A so as to properly and accurately direct the input beam 14 along the directed axis 544A prior to the input beam 14 being redirected by the redirector 518.

As with the previous embodiments, by directing the input beam 14 along the directed axis 544A, which is coaxial with the movement axis 366, and by positioning the redirector mover 520 on the input side of the redirector 518 as illustrated and described herein, various design advantages can be realized. For example, the diameter of the redirector mover 520 is no longer a limitation on the length of the redirector 518, i.e. the length of the periscope, which enables the optical fiber switch 516 to be more compact, reduces the inertia of the redirector 518 during switching operations, enables higher switching speeds to be achieved, and provides increased flexibility in choosing the redirector mover 520.

Figure 6:
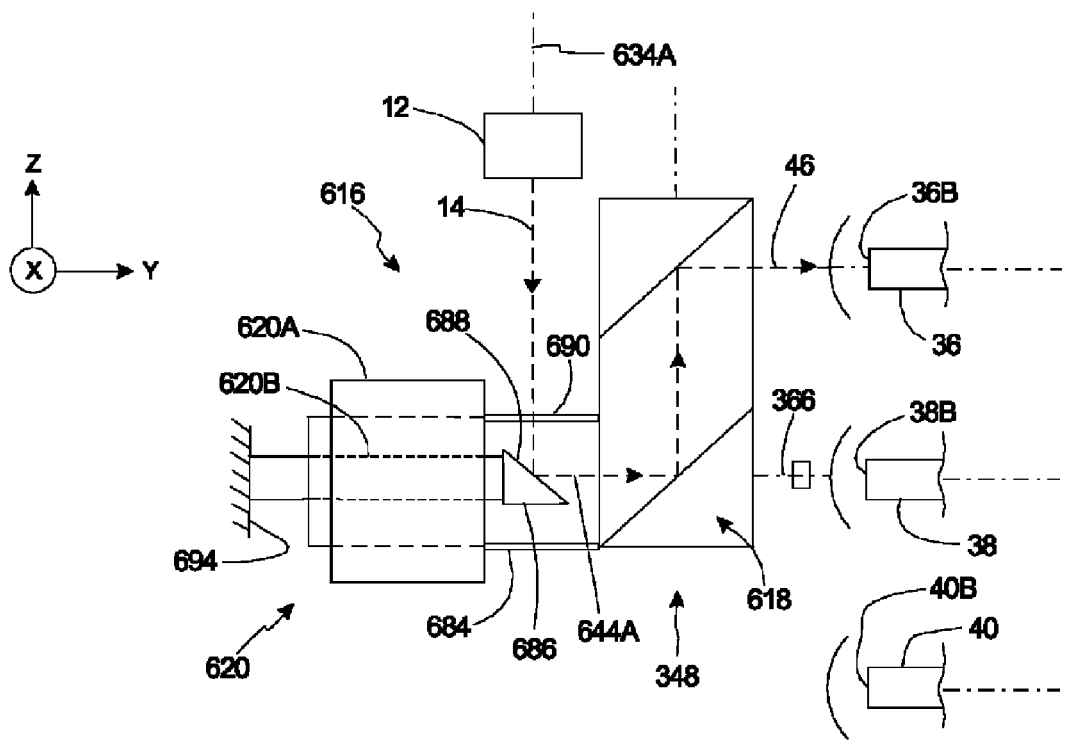
FIG. 6 is a simplified side view of a portion of yet another embodiment of the optical fiber switch having features of the present invention.

FIG. 6 is a simplified side view of a portion of yet another embodiment of the optical fiber switch 616 having features of the present invention. It should be noted that the redirector guide 380 and the mounting base 26 have been omitted from FIG. 6 for purposes of clarity. As illustrated, the optical fiber switch 616 is somewhat similar to the optical fiber switches 16, 416, 516 illustrated and described in detail above. For example, the redirector 618 is substantially similar in design and function to the redirectors 18, 418, 518 illustrated and described above. As with the previous embodiments, the redirector 618 can be alternatively positioned in the first position 348 (as illustrated in FIG. 6), the second position 350 (illustrated in FIG. 3B), the third position 352 (illustrated in FIG. 3C), and the fourth position (not illustrated). Additionally, the light source 12 again launches and directs the input beam 14 along the input axis 634A toward the redirector 618, and the redirector 618 again redirects the input beam 14 so that the redirected beam 46 is selectively and alternatively redirected toward (i) the first fiber inlet 36B of the first output fiber 36 when the redirector is positioned in the first position 348, (ii) the second fiber inlet 38B of the second output fiber 38 when the redirector is positioned in the second position 350, (ii) the third fiber inlet 40B of the third output fiber 40 when the redirector is positioned in the third position 352, and (iv) the fourth fiber inlet (not illustrated) of the fourth output fiber 42 (illustrated in FIG. 1) when the redirector is positioned in the fourth position.

Further, in the embodiment illustrated in FIG. 6, the redirector mover 620 again includes a first mover component 620A and the second mover component 620B that interact with one another to move the redirector 618 as desired. However, in this embodiment, during use of the redirector mover 620, the first mover component 620A is adapted to move, e.g., rotate, relative to the second mover component 620B. Accordingly, in this embodiment, the first mover component 620A can be referred to generally as and/or function as the moving component or rotor component, and the second mover component 620B can be referred to generally as and/or function as the fixed component or stator component. Additionally, in this embodiment, the redirector 618 can be fixedly coupled to and/or can be integrally formed with the first mover component 620A. For example, as illustrated in FIG. 6, the optical fiber switch 616 further includes a coupler 684 that fixedly couples the first mover component 620A to the redirector 618. With this design, movement, e.g., rotation, of the first mover component 620A relative to the second mover component 620B results in the corresponding movement, e.g., rotation, of the redirector 618 about the movement axis 366. Moreover, as illustrated, the input beam 14 is directed along the directed axis 644A substantially between the second mover component 620B, i.e. the fixed component, and the redirector 618 prior to the input beam 14 being redirected by the redirector 618. Stated another way, the input beam 14 is directed along the directed axis 644A on an input side of the redirector 618 prior to the input beam 14 being redirected by the redirector 618.

Similar to the embodiments illustrated in FIG. 4 and FIG. 5, in this embodiment, the input axis 634A is substantially perpendicular to the movement axis 366 of the redirector 618. Thus, in the embodiment illustrated in FIG. 6, the optical fiber switch 616 also includes a director 686, e.g., a mirror, that directs the input beam 14 from the input axis 634A so that the input beam 14 is properly directed along a directed axis 644A prior to the input beam 14 being redirected by the redirector 618. More particularly, the director 686 includes a director reflective surface 688 that directs the input beam 14 from the input axis 634A to the directed axis 644A. In one embodiment, the director reflective surface 688 is positioned at an angle of approximately forty-five degrees relative to the input beam 14 as the input beam 14 moves along the input axis 634A, such that the input beam 14 will be reflected or directed by approximately ninety degrees from the input axis 634A to the directed axis 644A. As with the previous embodiments, the directed axis 644A is coaxial with the movement axis 366.

Additionally, to enable the input beam 14 to necessarily contact the director reflective surface 688, the coupler 684 includes one or more coupler windows 690. With this design, as the input beam 14 is directed along the input axis 634A, the input beam 14 passes through one of the coupler windows 690 prior to contacting the director reflective surface 688.

Further, the director reflective surface 688 is mounted on the second mover component 620B, which in this embodiment, as noted above, is in a fixed position. To more effectively maintain the fixed position of the second mover component 620B, and thus the director reflective surface 688, the second mover component 620B is fixedly secured to a director support surface 694. With this design, the director reflective surface 688 is consistently maintained at the proper angle relative to the input axis 634A so as to properly and accurately direct the input beam 14 along the directed axis 644A prior to the input beam 14 being redirected by the redirector 618.

As with the previous embodiments, by directing the input beam 14 along the directed axis 644A, which is coaxial with the movement axis 366, and by positioning the redirector mover 620 on the input side of the redirector 618 as illustrated and described herein, various design advantages can be realized. For example, the diameter of the redirector mover 620 is no longer a limitation on the length of the redirector 618, i.e. the length of the periscope, which enables the optical fiber switch 616 to be more compact, reduces the inertia of the redirector 618 during switching operations, enables higher switching speeds to be achieved, and provides increased flexibility in choosing the redirector mover 620.

Figure 7:
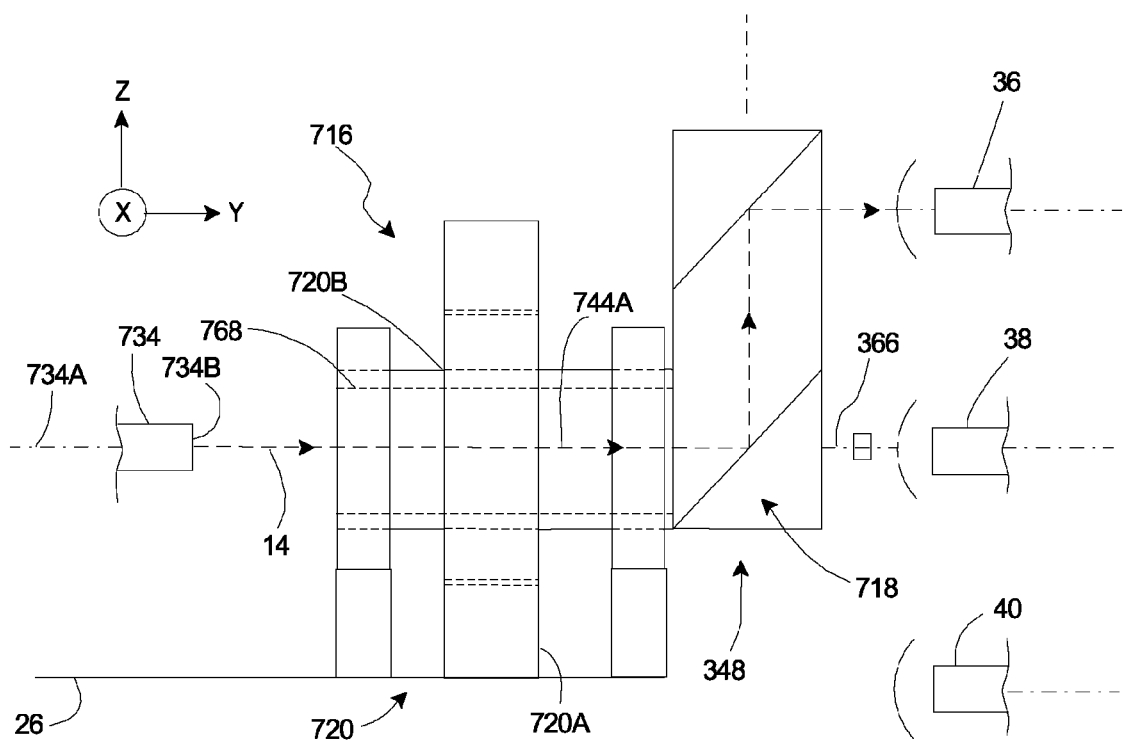
FIG. 7 is a simplified side view of a portion of the mounting base and still yet another embodiment of the optical fiber switch having features of the present invention.

FIG. 7 is a simplified side view of a portion of the mounting base 26 and still yet another embodiment of the optical fiber switch 716 having features of the present invention, with the optical fiber switch 716 being in the first position 348. The optical fiber switch 716 is substantially similar to the optical fiber switch 16 illustrated and described in detail above in relation to FIGS. 3A-3C. For example, the optical fiber switch includes a redirector 718, a redirector mover 720, and the plurality of output fibers 36, 38, 40 that are substantially similar to the redirector 18, the redirector mover 20, and the plurality of output fibers 36, 38, 40 illustrated and described in detail above in relation to FIGS. 3A-3C. More particularly, (i) the redirector mover 720 again includes a first mover component 720A and a second mover component 720B that interact with one another to move the redirector 718 as desired; (ii) the second mover component 720B (i.e. the moving component or rotor component) again extends through and rotates relative to the first mover component 720A (i.e. the fixed component or stator component) about the movement axis 366; (iii) the redirector 718 is again fixedly coupled to and/or integrally formed with the second mover component 720B; and (iv) the second mover component 720B again includes a component aperture 768 (illustrated with dotted lines) that is substantially centrally located within the second mover component 720B and which extends substantially the entire length of the second mover component 720B.

However, in this embodiment, the optical fiber switch 716 further includes an input fiber 734. The input fiber 734 is an optical fiber that transfers and directs the input beam 14 from the light source 12 (illustrated in FIG. 1) toward the redirector 718. In certain embodiments, the input fiber 734 launches the input beam 14 such that the input beam 14 is initially directed along an input axis 734A and through the component aperture 768. In this embodiment, the input axis 734A is again substantially parallel to the Y axis. Alternatively, the input axis 734A can be substantially parallel to the X axis, substantially parallel to the Z axis, or in another direction. Additionally, the input beam 14 is again directed along a directed axis 744A prior to the input beam 14 being redirected by the redirector 18 toward one of the locations 22A, 22B, 22C, 22D (illustrated in FIG. 1). In the embodiment illustrated in FIG. 7, the directed axis 744A is again substantially coaxial with the input axis 734A. Moreover, as illustrated, the input beam 14 is again directed along the directed axis 744A substantially between the first mover component 720A, i.e. the fixed component, and the redirector 718 prior to the input beam 14 being redirected by the redirector 718. Stated another way, the input beam 14 is directed along the directed axis 744A on an input side of the redirector 718 prior to the input beam 14 being redirected by the redirector 718.

Additionally, as shown in FIG. 7, the input beam 14 can be directed along the input axis 734A and along the directed axis 744A without the path of the input beam 14 being altered. Stated another way, in the embodiment illustrated in FIG. 7, the path of the input beam 14 need not be altered prior to the input beam 14 being redirected by the redirector 718 because the directed axis 744A is coaxial with the input axis 734A.

Further, FIG. 7 illustrates that the input fiber 734 includes an outlet end 734B that is positioned near the redirector mover 720 and that launches the input beam 14 along the input axis 734A and through the component aperture 768, the input beam 14 being subsequently directed along the directed axis 744A, which in this embodiment is substantially coaxial with the input axis 734A, and toward the redirector 718. Additionally, in this embodiment, the redirector mover 720 is positioned substantially between the outlet end 734B of the input fiber 734 and the redirector 718.

Moreover, as with the previous embodiments, by directing the input beam 14 along the directed axis 744A, which is coaxial with the movement axis 366, and by positioning the redirector mover 720 on the input side of the redirector 718 as illustrated and described herein, various design advantages can be realized. For example, the diameter of the redirector mover 720 is no longer a limitation on the length of the redirector 718, i.e. the length of the periscope, which enables the optical fiber switch 716 to be more compact, reduces the inertia of the redirector 718 during switching operations, enables higher switching speeds to be achieved, and provides increased flexibility in choosing the redirector mover 720.

While a number of exemplary aspects and embodiments of an optical fiber switch 16 have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. An optical fiber switch for alternatively redirecting an input beam along a first redirected axis and along a second redirected axis, the input beam being launched along an input axis and directed along a directed axis, the optical switch comprising:
   a redirector that is positioned in the path of the input beam along the directed axis, the redirector redirecting the input beam so that a redirected beam alternatively launches from the redirector (i) along the first redirected axis that is spaced apart from the directed axis when the redirector is positioned at a first position, and (ii) along the second redirected axis that is spaced apart from the directed axis when the redirector is positioned at a second position that is different from the first position; and
   a redirector mover that moves the redirector about a movement axis between the first position and the second position, the redirector mover including a stator component and a rotor component that moves relative to the stator component, the input beam being directed along the directed axis substantially between the stator component and the redirector prior to the input beam being redirected by the redirector, wherein at least one of the stator component and the rotor component includes a component aperture, and wherein the input beam is directed through the component aperture.

2. The optical fiber switch of claim 1 wherein the component aperture is coaxial with the movement axis.

3. The optical fiber switch of claim 1 wherein the movement axis is substantially coaxial with the directed axis, and wherein the redirector is fixedly coupled to the rotor component.

4. The optical fiber switch of claim 1 wherein the redirector includes an input reflective surface that is positioned in the path of the input beam along the directed axis and an output reflective surface that is substantially parallel to and spaced apart from the input reflective surface, the input reflective surface being fixedly coupled to the output reflective surface.

5. The optical fiber switch of claim 1 further comprising a director having a director reflective surface that directs the input beam from the input axis to the directed axis.

6. The optical fiber switch of claim 1 further comprising a locking assembly that selectively locks the redirector at the first position and at the second position.

7. A light source assembly comprising a light source that generates an input beam, and the optical fiber switch of claim 1 that alternatively redirects the input beam along the first redirected axis and the second redirected axis.

8. The light source assembly of claim 7 further comprising a control system that controls the optical fiber switch to perform individual switching operations within a substantially constant movement time rate regardless of the temperature of the optical fiber switch.

9. A method for alternatively redirecting an input beam, the input beam being launched along an input axis, the method comprising the steps of:
   directing the input beam along a directed axis;
   positioning a redirector along the directed axis in the path of the input beam;
   redirecting the input beam with the redirector so that a redirected beam alternatively launches from the redirector (i) along a first redirected axis that is spaced apart from the directed axis when the redirector is positioned at a first position, and (ii) along a second redirected axis that is spaced apart from the directed axis when the redirector is positioned at a second position that is different from the first position; and
   moving the redirector about a movement axis between the first position and the second position with a redirector mover, the redirector mover including a stator component and a rotor component that moves relative to the stator component, the input beam being directed along the directed axis substantially between the stator component and the redirector prior to the input beam being redirected by the redirector, wherein at least one of the stator component and the rotor component has a component aperture, and wherein the input beam is directed through the component aperture.

10. The method of claim 9 wherein the step of moving the redirector includes the component aperture being coaxial with the movement axis.

11. The method of claim 9 wherein the step of moving the redirector includes the movement axis being substantially coaxial with the directed axis, and wherein the step of positioning the redirector includes the step of fixedly coupling the redirector to the rotor component.

12. The method of claim 9 wherein the step of positioning the redirector includes the redirector comprising an input reflective surface that is positioned along the directed axis in the path of the input beam, and an output reflective surface that is substantially parallel to and spaced apart from the input reflective surface, the input reflective surface being fixedly coupled to the output reflective surface.

13. The method of claim 9 wherein the step of directing the input beam includes the step of directing the input beam from the input axis to the directed axis with a director reflective surface.

14. The method of claim 9 further comprising the step of selectively locking the redirector at the first position and at the second position with a locking assembly.

15. A method for forming a light source assembly including the steps of generating an input beam with a light source, and alternatively redirecting the input beam along the first redirected axis and along the second redirected axis with the method of claim 9.

16. An optical fiber switch for alternatively redirecting an input beam along a first redirected axis and along a second redirected axis, the input beam being launched along an input axis and directed along a directed axis, the optical switch comprising:
a redirector that is positioned in the path of the input beam along the directed axis, the redirector redirecting the input beam so that a redirected beam alternatively launches from the redirector (i) along the first redirected axis that is spaced apart from the directed axis when the redirector is positioned at a first position, and (ii) along the second redirected axis that is spaced apart from the directed axis when the redirector is positioned at a second position that is different from the first position;
a redirector mover that moves the redirector about a movement axis between the first position and the second position, the redirector mover including a stator component and a rotor component that moves relative to the stator component, wherein at least one of the stator component and the rotor component includes a component aperture; wherein the input beam is directed through the component aperture; and wherein the component aperture is coaxial with the movement axis; and
a locking assembly that selectively locks the redirector at the first position and at the second position.

17. An optical fiber switch for alternatively redirecting an input beam along a first redirected axis and along a second redirected axis, the input beam being launched along an input axis and directed along a directed axis, the optical switch comprising:
a director having a director reflective surface that directs the input beam from the input axis to the directed axis;
a window, wherein the input beam passes through the window prior to contacting the director reflective surface;
a redirector that is positioned in the path of the input beam along the directed axis, the redirector redirecting the input beam so that a redirected beam alternatively launches from the redirector (i) along the first redirected axis that is spaced apart from the directed axis when the redirector is positioned at a first position, and (ii) along the second redirected axis that is spaced apart from the directed axis when the redirector is positioned at a second position that is different from the first position; and
a redirector mover that moves the redirector about a movement axis between the first position and the second position, the redirector mover including a stator component and a rotor component that moves relative to the stator component, the director reflective surface being positioned substantially between the stator component and the redirector, and the input beam being directed along the directed axis substantially between the stator component and the redirector prior to the input beam being redirected by the redirector.

18. The optical fiber switch of claim 17 wherein the director includes a director shaft that extends through the window.

19. An optical fiber switch for alternatively redirecting an input beam along a first redirected axis and along a second redirected axis, the input beam being launched along an input axis and directed along a directed axis, the optical switch comprising:
a director having a director reflective surface that directs the input beam from the input axis to the directed axis;
a redirector that is positioned in the path of the input beam along the directed axis, the redirector redirecting the input beam so that a redirected beam alternatively launches from the redirector (i) along the first redirected axis that is spaced apart from the directed axis when the redirector is positioned at a first position, and (ii) along the second redirected axis that is spaced apart from the directed axis when the redirector is positioned at a second position that is different from the first position; and
a redirector mover that moves the redirector about a movement axis between the first position and the second position, the redirector mover including a stator component and a rotor component that moves relative to the stator component, at least one of the stator component and the rotor component including a component aperture, wherein the director includes a director shaft that extends through the component aperture, the director shaft retaining the director reflective surface such that the director reflective surface is positioned substantially between the stator component and the redirector, and the input beam being directed along the directed axis substantially between the stator component and the redirector prior to the input beam being redirected by the redirector.

20. An optical fiber switch for alternatively redirecting an input beam along a first redirected axis and along a second redirected axis, the input beam being launched along an input axis and directed along a directed axis, the optical switch comprising:
a director having a director reflective surface that directs the input beam from the input axis to the directed axis;
a redirector that is positioned in the path of the input beam along the directed axis, the redirector redirecting the input beam so that a redirected beam alternatively launches from the redirector (i) along the first redirected axis that is spaced apart from the directed axis when the redirector is positioned at a first position, and (ii) along the second redirected axis that is spaced apart from the directed axis when the redirector is positioned at a second position that is different from the first position; and
a redirector mover that moves the redirector about a movement axis between the first position and the second position, the redirector mover including a stator component and a rotor component that moves relative to the stator component, the director reflective surface being secured to the stator component, and the input beam being directed along the directed axis substantially between the stator component and the redirector prior to the input beam being redirected by the redirector.

21. A light source assembly comprising:
a light source that generates an input beam;
an optical fiber switch that alternatively redirects the input beam along the first redirected axis and the second redirected axis, the optical fiber switch comprising a redirector that is positioned in the path of the input beam along the directed axis, the redirector redirecting the input beam so that a redirected beam alternatively launches from the redirector (i) along the first redirected axis that is spaced apart from the directed axis when the redirector is positioned at a first position, and (ii) along the second redirected axis that is spaced apart from the directed axis when the redirector is positioned at a second position that is different from the first position; and
a redirector mover that moves the redirector about a movement axis between the first position and the second position, the redirector mover including a stator component and a rotor component that moves relative to the stator component, the input beam being directed along the directed axis substantially between the stator component and the redirector prior to the input beam being redirected by the redirector; and
a control system that controls the optical fiber switch to perform individual switching operations within a substantially constant movement time rate regardless of the temperature of the optical fiber switch.

22. A method for alternatively redirecting an input beam, the input beam being launched along an input axis, the method comprising the steps of:
directing the input beam from the input axis to a directed axis with a director reflective surface, the director reflective surface being retained with a director shaft;
positioning a redirector along the directed axis in the path of the input beam;
redirecting the input beam with the redirector so that a redirected beam alternatively launches from the redirector (i) along a first redirected axis that is spaced apart from the directed axis when the redirector is positioned at a first position, and (ii) along a second redirected axis that is spaced apart from the directed axis when the redirector is positioned at a second position that is different from the first position;
moving the redirector about a movement axis between the first position and the second position with a redirector mover, the redirector mover including a stator component and a rotor component that moves relative to the stator component, at least one of the stator component and the rotor component having a component aperture, the director shaft extending through the component aperture such that the director reflective surface is positioned substantially between the stator component and the redirector, and the input beam being directed along the directed axis substantially between the stator component and the redirector prior to the input beam being redirected by the redirector.

23. A method for alternatively redirecting an input beam, the input beam being launched along an input axis, the method comprising the steps of:
directing the input beam from the input axis to a directed axis with a director reflective surface, the input beam passing through a window prior to the input beam contacting the director reflective surface;
positioning a redirector along the directed axis in the path of the input beam;
redirecting the input beam with the redirector so that a redirected beam alternatively launches from the redirector (i) along a first redirected axis that is spaced apart from the directed axis when the redirector is positioned at a first position, and (ii) along a second redirected axis that is spaced apart from the directed axis when the redirector is positioned at a second position that is different from the first position;
moving the redirector about a movement axis between the first position and the second position with a redirector mover, the redirector mover including a stator component and a rotor component that moves relative to the stator component, the director reflective surface being positioned substantially between the stator component and the redirector, and the input beam being directed along the directed axis substantially between the stator component and the redirector prior to the input beam being redirected by the redirector.

24. A method for alternatively redirecting an input beam, the input beam being launched along an input axis, the method comprising the steps of:
directing the input beam from the input axis to a directed axis with a director reflective surface;
positioning a redirector along the directed axis in the path of the input beam;
redirecting the input beam with the redirector so that a redirected beam alternatively launches from the redirector (i) along a first redirected axis that is spaced apart from the directed axis when the redirector is positioned at a first position, and (ii) along a second redirected axis that is spaced apart from the directed axis when the redirector is positioned at a second position that is different from the first position;
moving the redirector about a movement axis between the first position and the second position with a redirector mover, the redirector mover including a stator component and a rotor component that moves relative to the stator component, the director reflective surface being secured to the stator component, and the input beam being directed along the directed axis substantially between the stator component and the redirector prior to the input beam being redirected by the redirector.

* * * * *

UNITED STATES PATENT AND TRADEMARK OFFICE
CERTIFICATE OF CORRECTION

PATENT NO. : 8,335,413 B2  
APPLICATION NO. : 13/267787  
DATED : December 18, 2012  
INVENTOR(S) : Dromaretsky et al.

It is certified that error appears in the above-identified patent and that said Letters Patent is hereby corrected as shown below:

In the Specification

In Column 1, Line 14, after the section titled Related Inventions, the following section is added:

GOVERNMENT RIGHTS

This invention was made with Government support under Contract Number N00173-10-C-6021 awarded by the Department of the Navy, Naval Research Laboratory. The Government has certain rights in the invention.

Signed and Sealed this  
Fifth Day of August, 2014

Michelle K. Lee  
*Deputy Director of the United States Patent and Trademark Office*